(12) United States Patent
Kusaka

(10) Patent No.: US 7,586,072 B2
(45) Date of Patent: Sep. 8, 2009

(54) CORRELATION OPERATION METHOD, CORRELATION OPERATION DEVICE, FOCUS DETECTION DEVICE AND IMAGING DEVICE

(75) Inventor: Yosuke Kusaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 7 days.

(21) Appl. No.: 11/819,686

(22) Filed: Jun. 28, 2007

(65) Prior Publication Data

US 2008/0112643 A1 May 15, 2008

(30) Foreign Application Priority Data

Nov. 15, 2006 (JP) ............................. 2006-308941

(51) Int. Cl.
*G02B 7/04* (2006.01)
*G01B 9/04* (2006.01)
(52) U.S. Cl. ................................. 250/201.2; 250/201.8
(58) Field of Classification Search ............. 250/201.2, 250/201.4, 201.5, 221, 201.7, 201.3, 201.1, 250/201.8, 227.2, 227.21; 396/125–128; 348/345–356; 356/3–22
See application file for complete search history.

(56) References Cited

U.S. PATENT DOCUMENTS

| | | | | | |
|---|---|---|---|---|---|
| 4,716,434 | A | * | 12/1987 | Taniguchi et al. | ............ 396/123 |
| 5,659,816 | A | * | 8/1997 | Uchiyama | .................... 396/124 |
| 5,960,219 | A | * | 9/1999 | Kageyama et al. | .......... 396/104 |
| 6,700,651 | B2 | * | 3/2004 | Taka | .......................... 356/3.14 |

FOREIGN PATENT DOCUMENTS

JP  A-04-338905  11/1992

* cited by examiner

*Primary Examiner*—Que T Le
*Assistant Examiner*—Pascal M Bui-Pho
(74) *Attorney, Agent, or Firm*—Oliff & Berridge, PLC

(57) ABSTRACT

A correlation operation method includes: first processing executed to match a signal level of an AC component contained in a first signal data string made up with a plurality of sets of first signal data with a signal level of an AC component contained in a second signal data string made up with a plurality of sets of second signal data; and correlation degree calculation processing executed to calculate a correlation degree indicating a degree of correlation between the first signal data string and the second signal data string having undergone the first processing.

19 Claims, 25 Drawing Sheets

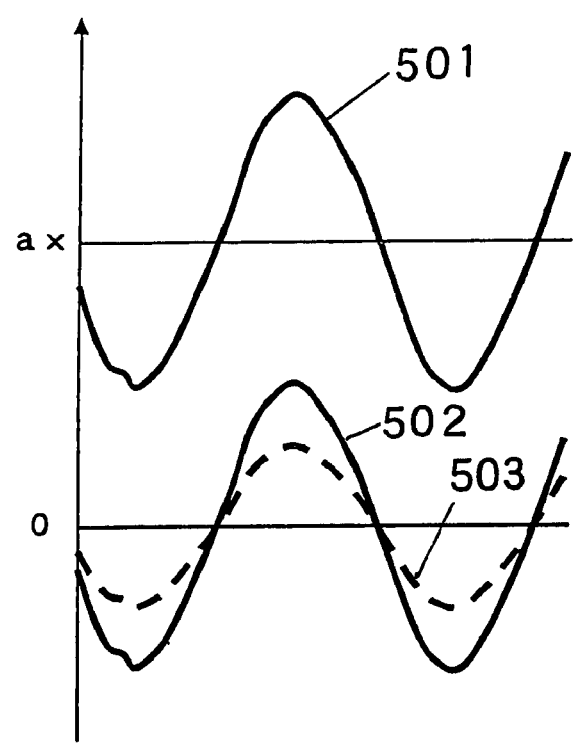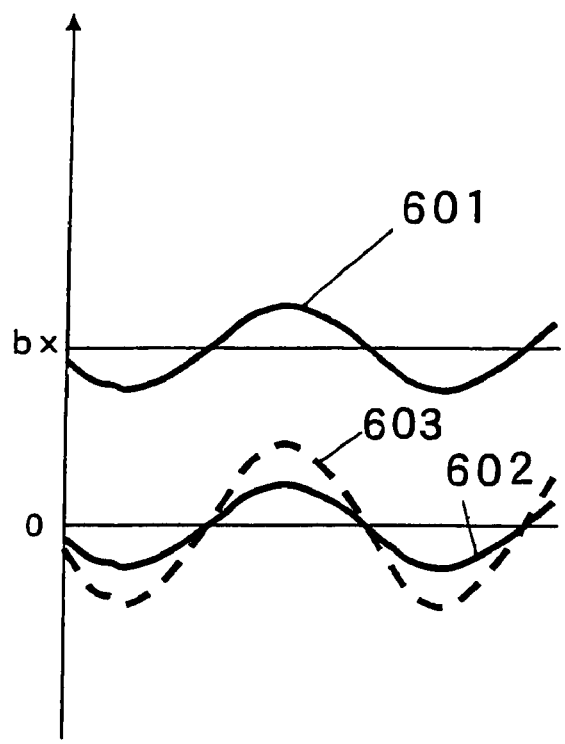

16  10
_____
   313

10  17
_____
   314

CORRELATION OPERATION METHOD, CORRELATION OPERATION DEVICE, FOCUS DETECTION DEVICE AND IMAGING DEVICE

INCORPORATION BY REFERENCE

The disclosure of the following priority application is herein incorporated by reference:

Japanese Patent Application No. 2006-308941 filed Nov. 15, 2006

BACKGROUND OF THE INVENTION

1. Field of the Invention

The present invention relates to a correlation operation method and a correlation operation device to be adopted when determining through an arithmetic operation a correlational relationship that exists among a plurality of signal data strings. It also relates to a focus detection device and an imaging device adopting the correlation operation method and the correlation operation device.

2. Description of Related Art

There are devices known in the related art that determine through an arithmetic operation the correlation between a pair of electrical signal data strings output from a pair of photoelectric conversion element arrays on which optical images of a target object are formed. For instance, there is a focus detection device that receives at image sensors a pair of light fluxes having passed through different areas of an exit pupil plane of a photographic optical system, converts a pair of optical images formed on the image sensor to a pair of electrical signal data strings and detects the focus adjustment state at the photographic optical system by determining through an arithmetic operation the correlation between the signal data strings (see Japanese Laid Open Patent Publication No. H04-338905.

SUMMARY OF THE INVENTION

However, the correlation operation method in the related art described above poses a problem in that if an offset difference or a gain difference manifests between the signal values indicated by a pair of signals data strings $A_1, A_2, \ldots A_N$ and $B_1, B_2, \ldots B_N$ (N indicates the number of sets of data), the correlation between the two signal data strings cannot be detected accurately.

According to the 1st aspect of the present invention, a correlation operation method comprises: first processing executed to match a signal level of an AC component contained in a first signal data string made up with a plurality of sets of first signal data with a signal level of an AC component contained in a second signal data string made up with a plurality of sets of second signal data; and correlation degree calculation processing executed to calculate a correlation degree indicating a degree of correlation between the first signal data string and the second signal data string having undergone the first processing.

According to the 2nd aspect of the present invention, in the correlation operation method according to the 1st aspect, it is preferred that: there is further provided second processing executed to match a signal level of a DC component contained in the first signal data string made up with the plurality of sets of first signal data with a signal level of a DC component contained in the second signal data string made up with the plurality of sets of second signal data; and the first processing is executed on at least either the first signal data string or the second signal data string having undergone the second processing.

According to the 3rd aspect of the present invention, a correlation operation method comprises: first processing executed to match a signal level of an AC component contained in a first signal data string made up with a plurality of sets of first signal data with a signal level of an AC component contained in a second signal data string made up with a plurality of sets of second signal data; and correlation degree calculation processing executed to calculate a correlation degree indicating a degree of correlation between the first signal data string and the second signal data string having undergone the first processing, and in the correlation degree calculation processing: the first signal data string and the second signal data string having undergone the first processing are shifted relative to each other by a specific extent, and then data in the first signal data string and data in the second signal data string present at positions corresponding to each other are compared with each other through comparison operation; a cumulative quantity is determined by integrating absolute values resulting from the comparison operation executed for different sets of data present at corresponding positions and also by varying the specific extent to which the first signal data string and the second signal data string are shifted relative to each other; and the correlation degree is determined by ascertaining a relative shift quantity indicating an extent of shift manifesting between the first signal data string and the second signal data string relative to each other based upon the specific extent at which the cumulative quantity assumes an extremal value.

According to the 4th aspect of the present invention, a correlation operation method comprises: first processing executed to match a signal level of an AC component contained in a first signal data string made up with a plurality of sets of first signal data with a signal level of an AC component contained in a second signal data string made up with a plurality of sets of second signal data; and correlation degree calculation processing executed to calculate a correlation degree indicating a degree of correlation between the first signal data string and the second signal data string having undergone the first processing, and: in the first processing, a third signal data string is generated by normalizing the first signal data string in correspondence to a total sum of absolute values indicated by the first signal data and a fourth signal data string is generated by normalizing the second signal data string in correspondence to a total sum of absolute values indicated by the second signal data; and in the correlation degree calculation processing, a correlation degree indicating a degree of correlation between the third signal data string and the fourth signal data string is calculated.

According to the 5th aspect of the present invention, a correlation operation method comprises: first processing executed to match a signal level of an AC component contained in a first signal data string made up with a plurality of sets of first signal data with a signal level of an AC component contained in a second signal data string made up with a plurality of sets of second signal data; and correlation degree calculation processing executed to calculate a correlation degree indicating a degree of correlation between the first signal data string and the second signal data string having undergone the first processing, and: in the first processing, a third signal data string is generated by normalizing the first signal data string in correspondence to a total sum of absolute values indicated by the first signal data and a fourth signal data string is generated by normalizing the second signal data string in correspondence to a total sum of absolute values indicated by the data in the second signal data string; and in the correlation degree calculation processing, the third signal data string and the fourth signal data string are shifted relative to each other by a specific extent, then data in the third signal data string and data in the fourth signal data string present at positions corresponding to each other are compared with each other through comparison operation, a cumulative quantity is determined by integrating absolute values resulting from the comparison operation executed for different sets of data present at corresponding positions and also by varying the specific extent to which the third signal data string and the fourth signal data string are shifted relative to each other, and the correlation degree of the correlation between the first signal data string and the second signal data string is determined by ascertaining a relative shift quantity indicating an extent of shift manifesting between the third signal data string and the fourth signal data string relative to each other based upon the specific extent at which the cumulative quantity assumes an extremal value.

According to the 6th aspect of the present invention, a correlation operation method comprises: first processing executed to match a signal level of an AC component contained in a first signal data string made up with a plurality of sets of first signal data with a signal level of an AC component contained in a second signal data string made up with a plurality of sets of second signal data; and correlation degree calculation processing executed to calculate a correlation degree indicating a degree of correlation between the first signal data string and the second signal data string having undergone the first processing, and: in the first processing, a third signal data string is generated by normalizing the first signal data string in correspondence to a total sum of absolute values indicated by the first signal data and a fourth signal data string is generated by normalizing the second signal data string in correspondence to a total sum of absolute values indicated by the second signal data; and in the correlation degree calculation processing, a correlation degree indicating a degree of correlation between the third signal data string and the fourth signal data string is calculated based upon a total sum of absolute values representing differences between first data in the third signal data string and second data in the fourth signal data string corresponding to the first data.

According to the 7th aspect of the present invention, a correlation operation method comprises: first processing executed to match a signal level of an AC component contained in a first signal data string made up with a plurality of sets of first signal data with a signal level of an AC component contained in a second signal data string made up with a plurality of sets of second signal data; and correlation degree calculation processing executed to calculate a correlation degree indicating a degree of correlation between the first signal data string and the second signal data string having undergone the first processing, and: in the first processing, a third signal data string is generated by normalizing the first signal data string in correspondence to a total sum of absolute values indicated by the first signal data and a fourth signal data string is generated by normalizing the second signal data string in correspondence to a total sum of absolute values indicated by the second signal data; and in the correlation degree calculation processing, the third signal data string and the fourth signal data string are shifted relative to each other by a specific extent, then a difference between data in the third signal data string and data in the fourth signal data string present at positions corresponding to each other is calculated, a cumulative quantity is determined by integrating absolute values representing differences determined for different sets of data present at corresponding positions to each other and also by altering the specific extent to which the third signal data string and the fourth signal data string are shifted relative to each other, and the correlation degree is determined by ascertaining a relative shift quantity indicating an extent of shift manifesting between the third signal data string and the fourth signal data string relative to each other based upon the specific extent at which the cumulative quantity assumes an extremal value.

According to the 8th aspect of the present invention, in the correlation operation method according to the 4th aspect, it is preferred that the correlation degree calculation processing includes: first information generation processing executed to generate first operation data by multiplying first data in the third signal data string by data present near second data in the fourth signal data string corresponding to the first data; second information generation processing executed to generate second operation data by multiplying the second data in the fourth signal data string by data present near the first data in the third signal data string; and processing executed to calculate a correlation degree indicating a degree of correlation between the first operation data and the second operation data.

According to the 9th aspect of the present invention, in the correlation operation method according to the 4th aspect, it is preferred that the correlation degree calculation processing is executed at each shift position assumed as the third signal data string and the fourth signal data string are shifted relative to each other along a direction in which the data in the data strings are strung.

According to the 10th aspect of the present invention, a correlation operation device comprises: a correlation operation unit that calculates a correlation degree indicating a degree of correlation between a first signal data string made up with a plurality of sets of first signal data and a second signal data string made up with a plurality of sets of second signal data having undergone first processing executed to match a signal level of an AC component contained in the first signal data string with a signal level of an AC component contained in the second signal data string.

According to the 11th aspect of the present invention, in the arithmetic operation device according to the 10th aspect, it is preferred that the correlation operation unit also executes second processing for matching a signal level of a DC component contained in the first signal data string made up with the plurality of sets of first signal data with a signal level of a DC component contained in the second signal data string made up with the plurality of sets of second signal data, and executes the first processing on at least either of the first signal data string and the second signal data string having undergone the second processing.

According to the 12th aspect of the present invention, a correlation operation device comprises: a normalization unit that generates a third signal data string by normalizing a first signal data string made up with a plurality of sets of first signal data in correspondence to a total sum of absolute values indicated by the first signal data and generates a fourth signal data string by normalizing a second signal data string made up with a plurality of sets of second signal data in correspondence to a total sum of absolute values indicated by the second signal data; and a correlation degree calculation unit that calculates a correlation degree indicating a degree of correlation between the third signal data string and the fourth signal data string.

According to the 13th aspect of the present invention, in the correlation operation device according to the 12th aspect, it is preferred that: there is further provided an average value subtraction unit that generates a fifth signal data string constituted with sets of fifth signal data each obtained by subtracting an average value of values indicated by the plurality of sets of first signal data from a set of data in the first signal data string, and a sixth signal data string constituted with sets of sixth signal data each obtained by subtracting an average value of values indicated by the plurality of sets of second signal data from a set of data in the second signal data string; and the normalization unit generates the third signal data string by normalizing the fifth signal data string in correspondence to a total sum of absolute values of the fifth signal data and generates the fourth signal data string by normalizing the sixth signal data string in correspondence to a total sum of absolute values of the sixth signal data.

According to the 14th aspect of the present invention, in the correlation operation device according to the 12th aspect, it is preferred that the correlation degree calculation unit calculates the correlation degree between the third signal data string and the fourth signal data string in correspondence to a total sum of absolute values each representing a difference between first data in the third signal data string and second data in the fourth signal data string corresponding to the first data.

According to the 15th aspect of the present invention, in the correlation operation device according to the 12th aspect, it is preferred that: the correlation degree calculation unit includes a first information generation unit that generates first operation data by multiplying first data in the third signal data string by data present near second data in the fourth signal data string corresponding to the first data, and a second information generation unit that generates second operation data by multiplying the second data in the fourth signal data string by data present near the first data in the third signal data string; and the correlation degree calculation unit calculates a correlation degree indicating a degree of correlation between the first operation data and the second operation data.

According to the 16th aspect of the present invention, a focus detection device comprises: a photoelectric conversion element that receives via a focus detection optical system light fluxes having passed through a pair of pupil areas at a photographic optical system and outputs a pair of subject image signals; an image shift detection unit that determines a correlation degree indicating a degree of correlation between the pair of subject image signals output from the photoelectric conversion element by adopting a correlation operation method according to the 1 and detects an image shift quantity indicating an extent of image shift manifested by images formed through the photographic optical system based upon the correlation degree; and a focus detection unit that detects a state of focus adjustment at the photographic optical system based upon the image shift quantity.

According to the 17th aspect of the present invention, a focus detection device comprises: a photoelectric conversion unit that includes a micro-lens and a photoelectric conversion element, receives at the photoelectric conversion element via the micro-lens light fluxes having passed through a pair of pupil areas at a photographic optical system and outputs a pair of subject image signals; an image shift detection unit that determines a correlation degree indicating a degree of correlation between the pair of subject image signals output from the photoelectric conversion unit by adopting a correlation operation method according to the 1 and detects an image shift quantity indicating an extent of image shift manifested by images formed through the photographic optical system based upon the correlation degree; and a focus detection unit that detects a state of focus adjustment at the photographic optical system based upon the image shift quantity.

According to the 18th aspect of the present invention, in the focus detection device according to the 16th aspect, it is preferred that the focus detection optical system is an image reforming optical system that reforms onto the photoelectric conversion element a subject image having been formed on a predetermined focal plane of the photographic optical system.

According to the 19th aspect of the present invention, an imaging device-comprises a focus detection device according to the 16th aspect; and an image sensor that captures an image formed through the photographic optical system having undergone focus adjustment executed based upon the state of focus adjustment detected by the focus detection device.

BRIEF DESCRIPTION OF THE DRAWINGS

FIGS. 16A and 16B illustrate the concept of the correlation operation executed in the embodiment;

DESCRIPTION OF PREFERRED EMBODIMENTS

Figure 1:
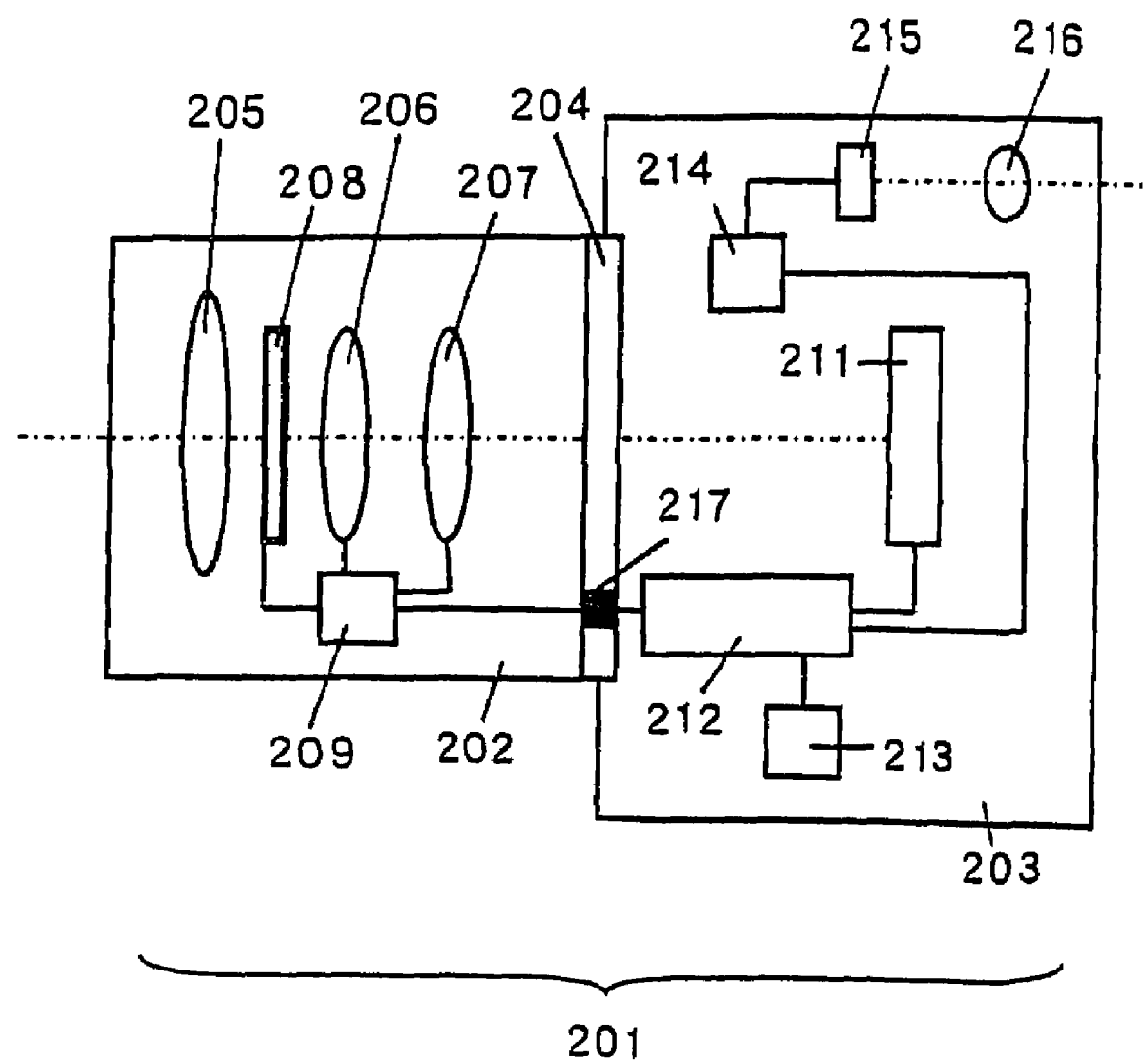
FIG. 1 shows the structure adopted in the digital still camera achieved in an embodiment.

An explanation is now given on an embodiment achieved by realizing the imaging device (the image-capturing device) according to the present invention in the form of a digital still camera. FIG. 1 shows the structure adopted in the digital still camera achieved in the embodiment. The digital still camera 201 in the embodiment comprises an exchangeable lens 202 and a camera body 203. The exchangeable lens 202 is mounted on a mount unit 204 at the camera body 203.

The exchangeable lens 202 includes lenses 205~207, an aperture 208 and a lens drive control device 209. It is to be noted that the lens 206 is a zooming lens and that the lens 207 is a focusing lens. The lens drive control device 209, constituted with a CPU and its peripheral components, controls the drive of the focusing lens 207 and the aperture 208, detects the positions of the zooming lens 206, the focusing lens 207 and the aperture 208, and transmits lens information and receives camera information by communicating with a control device in the camera body 203.

An image sensor 211, a camera drive control device 212, a memory card 213, an LCD driver 214, an LCD 215, an eyepiece lens 216 and the like are mounted at the camera body 203. The image sensor 211, set at the predetermined imaging plane (predetermined focal plane) of the exchangeable lens 202, captures a subject image formed through the exchangeable lens 202 and outputs image signals. At the image sensor 211, pixels used for imaging (hereafter simply referred to as imaging pixels) are disposed two-dimensionally, and rows of pixels used for focus detection (hereafter simply referred to as focus detection pixels), instead of imaging pixels, are disposed in the two-dimensional array over areas corresponding to focus detection positions.

The camera drive control device 212, constituted with a CPU and its peripheral components such as a memory, controls the drive of the image sensor 211, processes the captured image, executes focus detection and focus adjustment for the exchangeable lens 202, controls the aperture 208, controls display operation at the LCD 215, communicates with the lens drive control device 209 and controls the overall operational sequence in the camera. It is to be noted that the camera drive control device 212 communicates with the lens drive control device 209 via an electrical contact point 217 at the mount unit 204.

The memory card 213 is an image storage device in which captured images are stored. The LCD 215 is used as a display unit of a liquid crystal viewfinder (EVF: electronic viewfinder). The photographer is able to visually check a captured image displayed at the LCD 215 via the eyepiece lens 216.

The subject image formed on the image sensor 211 after passing through the exchangeable lens 202 undergoes photoelectric conversion at the image sensor 211 and an image output is provided to the camera drive control device 212. The camera drive control device 212 determines through an arithmetic operation the defocus amount indicating the extent of defocusing manifesting at a focus detection position based upon the outputs from the focus detection pixels and transmits the defocus amount to the lens drive control device 209. In addition, the camera drive control device 212 provides image signals generated based upon the outputs from the imaging pixels to the LCD driver 214 so as to display the image at the LCD 215 and also stores the image signals into the memory card 213.

The lens drive control device 209 detects the positions of the zooming lens 206, the focusing lens 207 and the aperture 208 and obtains through an arithmetic operation the lens information based upon the detected positions. Alternatively, the lens information corresponding to the detected positions may be selected from a lookup table prepared in advance. The lens information is then provided to the camera drive control device 212. In addition, the lens drive control device 209 calculates a lens drive quantity indicating the extent to which the lens is to be driven based upon the defocus amount received from the camera drive control device 212, and controls the drive of the focusing lens 207 based upon the lens drive quantity.

Figure 2:
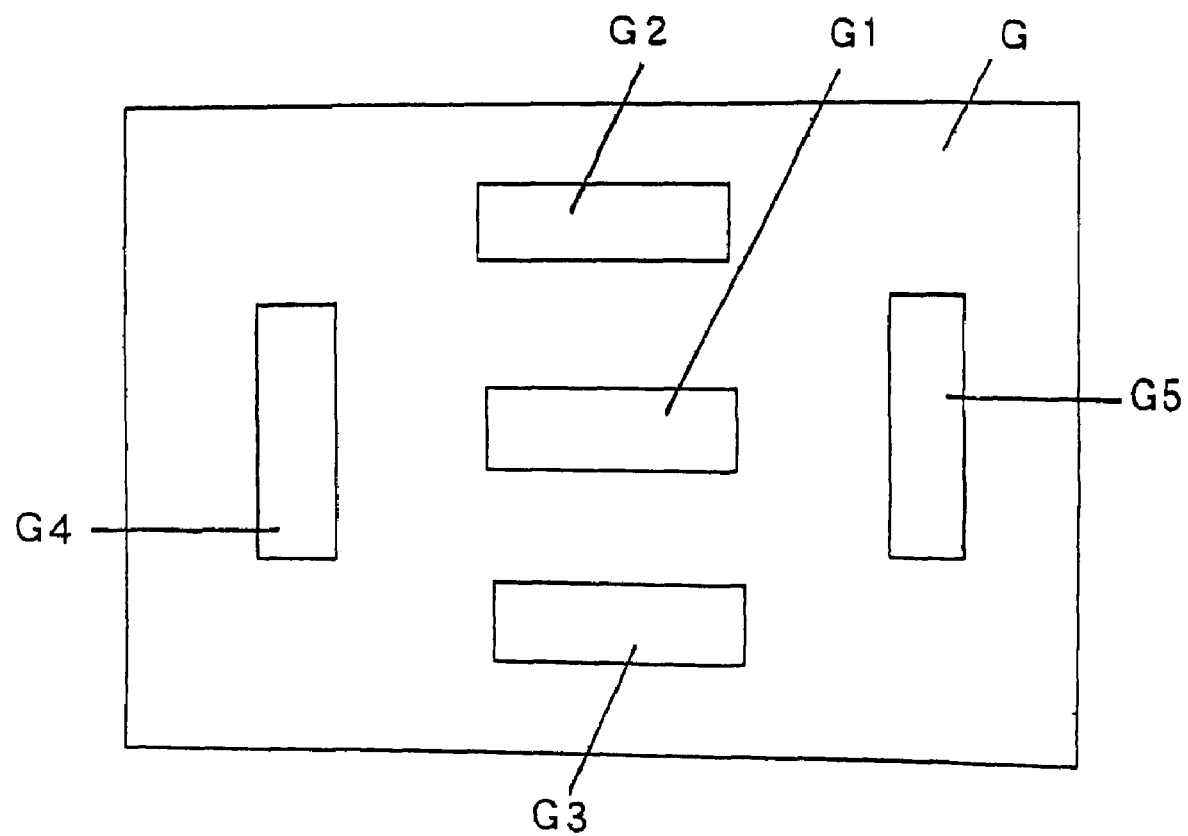
FIG. 2 shows the focus detection areas on the imaging plane set at the predetermined imaging plane of the exchangeable lens.

FIG. 2 shows focus detection areas on an imaging plane G set on the predetermined imaging plane of the exchangeable lens 202. Focus detection areas G1~G5 are set on the imaging plane G and focus detection pixels are arrayed in a row at the image sensor 211 in correspondence to each of the focus detection areas G1~G5 so that the focus detection pixel rows linearly extend along the lengthwise direction of the corresponding focus detection areas G1~G5. Namely, in the focus detection pixel rows on the image sensor 211, the image portions in the focus detection areas G1~G5 within the subject image formed on the photographic image plane G are sampled. The photographer manually selects a desired focus detection area among the focus detection areas G1~G5 in correspondence to the photographic composition.

Figure 3:
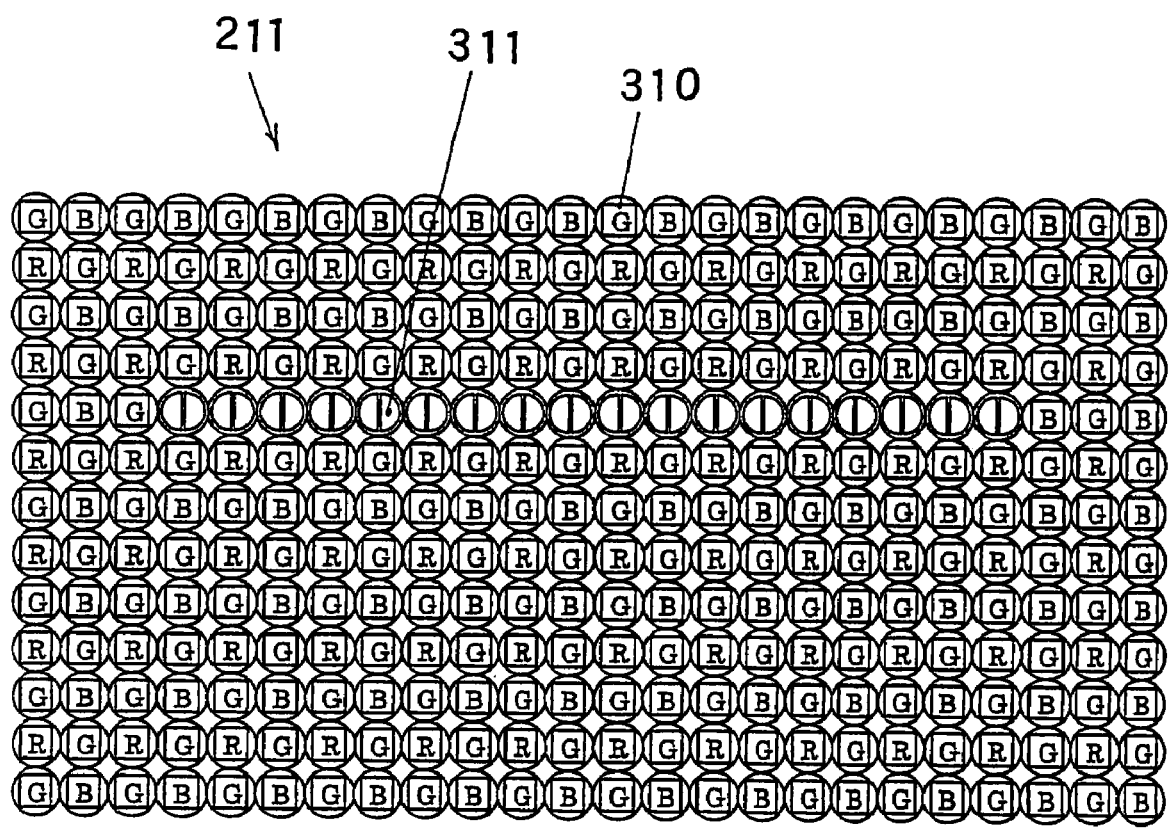
FIG. 3 is a front view showing in detail the structure adopted at the image sensor.

FIG. 3 is a front view showing in detail the structure adopted in the image sensor 211. It is to be noted that FIG. 3 shows in an enlargement part of the image sensor 211, near a given focus detection area set on the image sensor 211. The image sensor 211 is constituted with imaging pixels 310 and focus detection pixels 311 used in focus detection.

Figure 4:
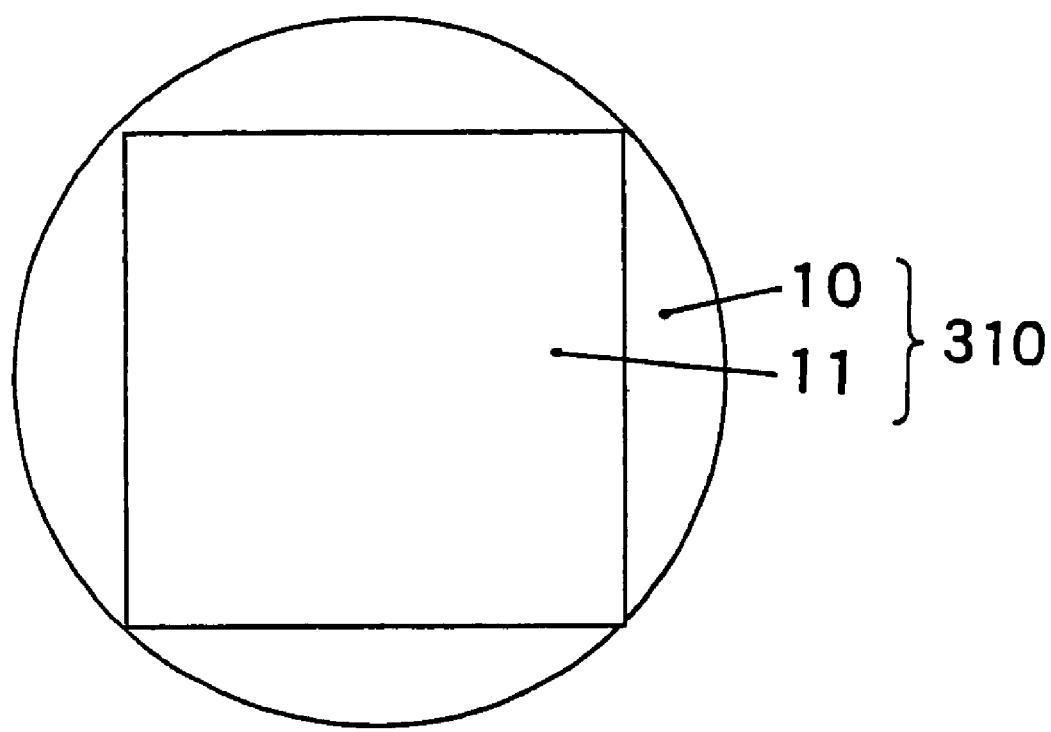
FIG. 4 shows the structure adopted in the imaging pixels.
Figure 5:
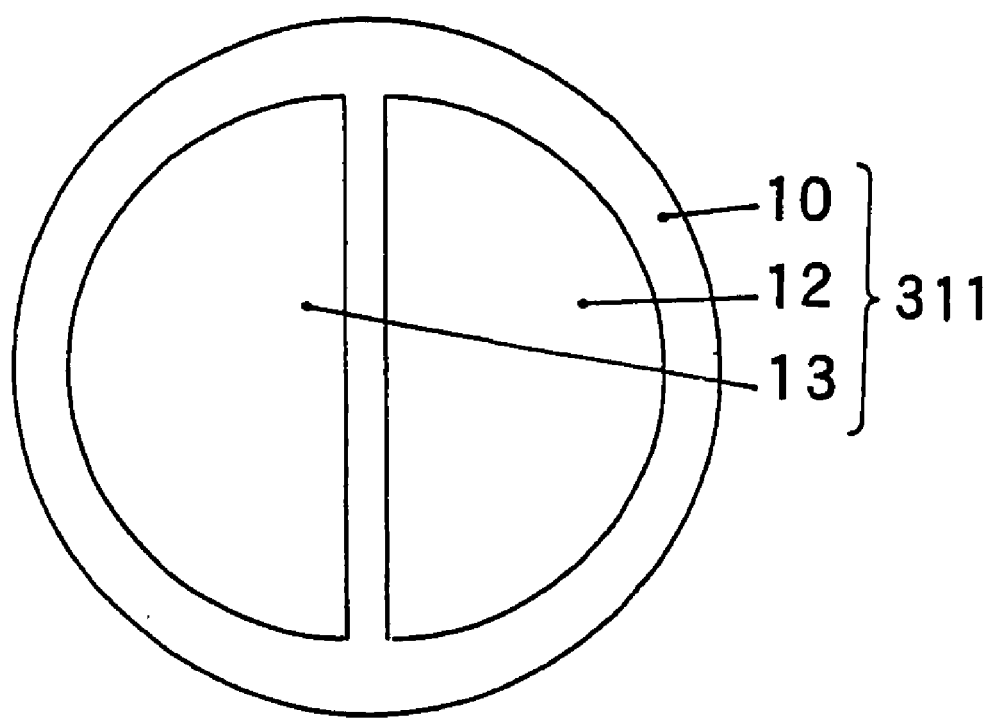
FIG. 5 shows the structure adopted in the focus detection pixels.

As shown in FIG. 4, the imaging pixels 310 each include a micro-lens 10, a photoelectric conversion unit 11 and a color filter (not shown). In addition, as shown in FIG. 5, the focus detection pixels 311 each include a micro-lens 10 and a pair of photoelectric conversion units 12 and 13. The photoelectric conversion unit 11 at the imaging pixel 310 is designed in a shape that allows the photoelectric conversion unit to receive all the light flux passing through the exit pupil of a high-speed exchangeable lens, e.g., an exit pupil equivalent to F 1.0, via the micro-lens 10. In addition, the pair of photoelectric conversion units 12 and 13 at the focus detection pixel 311 is designed in a shape that allows the photoelectric conversion units to receive all the light flux passing through a specific exit pupil of the exchangeable lens, e.g., an exit pupil equivalent to F 2.8, via the micro-lens 10. It is to be noted that the micro-lenses 10 used in the embodiment have a diameter around 8-12 μm.

Figure 6:
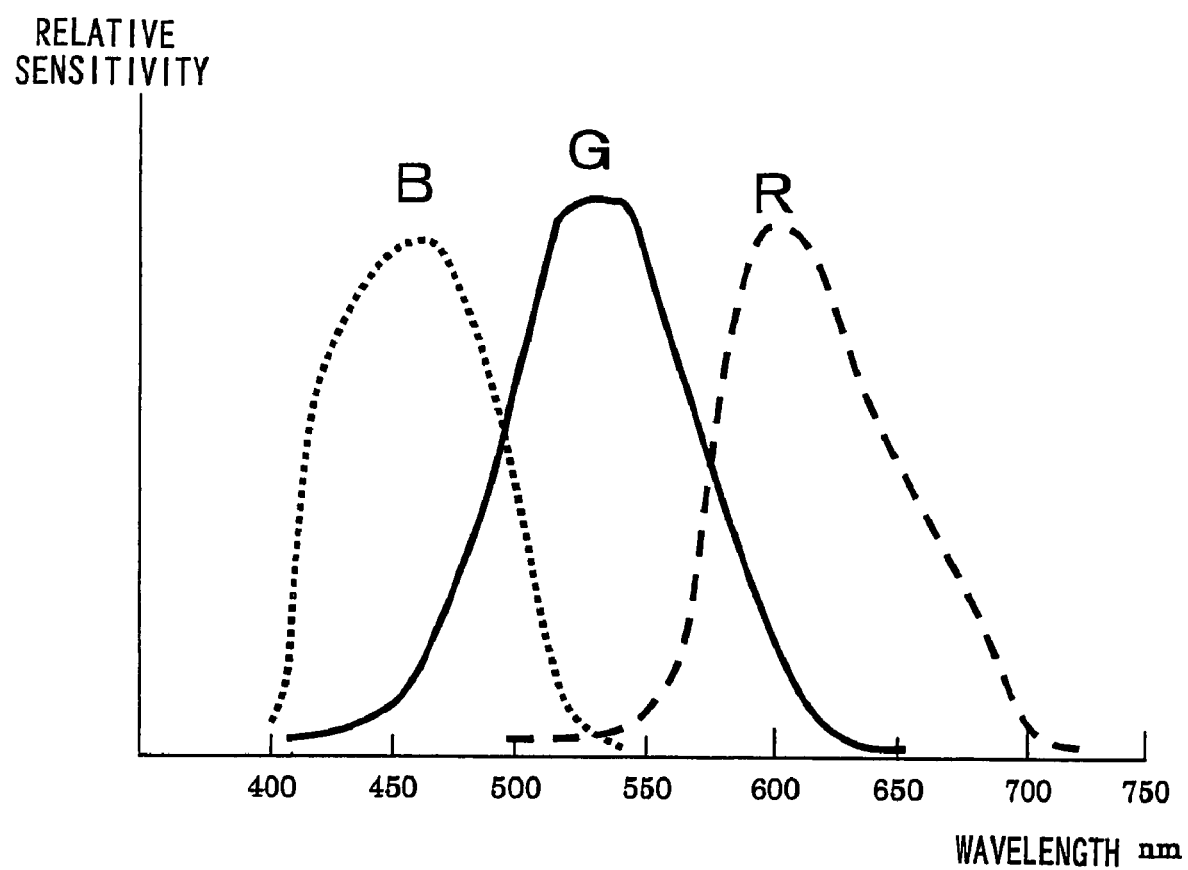
FIG. 6 shows the spectral sensitivity characteristics of the filters in various colors disposed at imaging pixels.

A color filter assuming red (R) color, green (G) color or blue (B) color is disposed at each of the imaging pixels 310 which are two-dimensionally arrayed, and the color filters achieve the spectral sensitivity characteristics respectively shown in FIG. 6. The imaging pixels 310 each equipped with a color filter in R, G or B are disposed in a Bayer array, as shown in FIG. 3.

Figure 7:
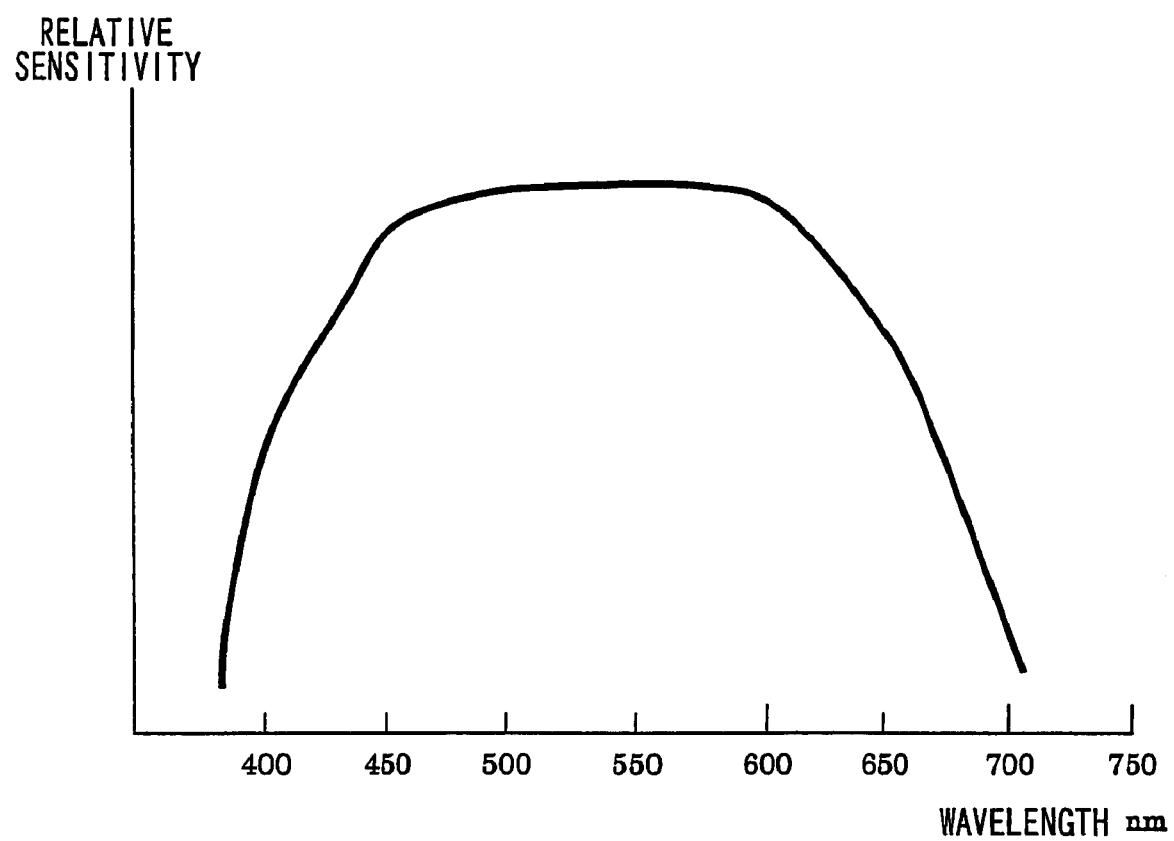
FIG. 7 shows the spectral sensitivity characteristics of the focus detection pixels.

It is to be noted that in order to assure a sufficient light quantity, no color filters are disposed at the focus detection pixels 311 and thus, the focus detection pixels 311 have the spectral sensitivity characteristics shown in FIG. 7, which are achieved by integrating the spectral sensitivity of the photodiodes engaged in photoelectric conversion and the spectral sensitivity characteristics of the infrared cut filters (not shown). Namely, the spectral sensitivity characteristics of the focus detection pixels 311 are similar to the sum of spectral sensitivity characteristics of the green pixels (G), the red pixels (R) and the blue pixels (B) shown in FIG. 6, which indicate sensitivity in a light wavelength range containing the light wavelength ranges corresponding to the sensitivity characteristics of all the pixels, i.e., the green pixels (G), the red pixels (R) and the blue pixels (B).

The focus detection pixels 311 are densely disposed along a straight line without allowing any interval in between at a horizontal or vertical row that would otherwise be occupied by imaging pixels 310 with B filters and G filters, in each of the focus detection areas G1 to G5 shown in FIG. 2. By disposing the focus detection pixels 311 along the horizontal or vertical rows that would otherwise be occupied by imaging pixels 310 equipped with B filters and G filters, it is ensured that a slight error occurring when generating pixel signals at positions occupied by the focus detection pixels 311 through pixel interpolation, can remain more or less unnoticeable to the human eye, since the human eye is more perceptive to red than to blue and the green pixels, disposed with higher density compared to the blue pixels and the red pixels, have a lower image defect contribution factor per pixel.

It is to be noted that in an image sensor achieved by two-dimensionally reiterating the imaging pixel array unit made up of imaging pixels equipped with the complementary color filters mentioned earlier, the focus detection pixels 311 should be disposed at pixel positions that would otherwise be occupied by imaging pixels equipped with cyan filters and magenta filters, i.e., imaging pixels equipped with color filters that contain a blue component with which the output error is relatively unnoticeable.

Figure 8:
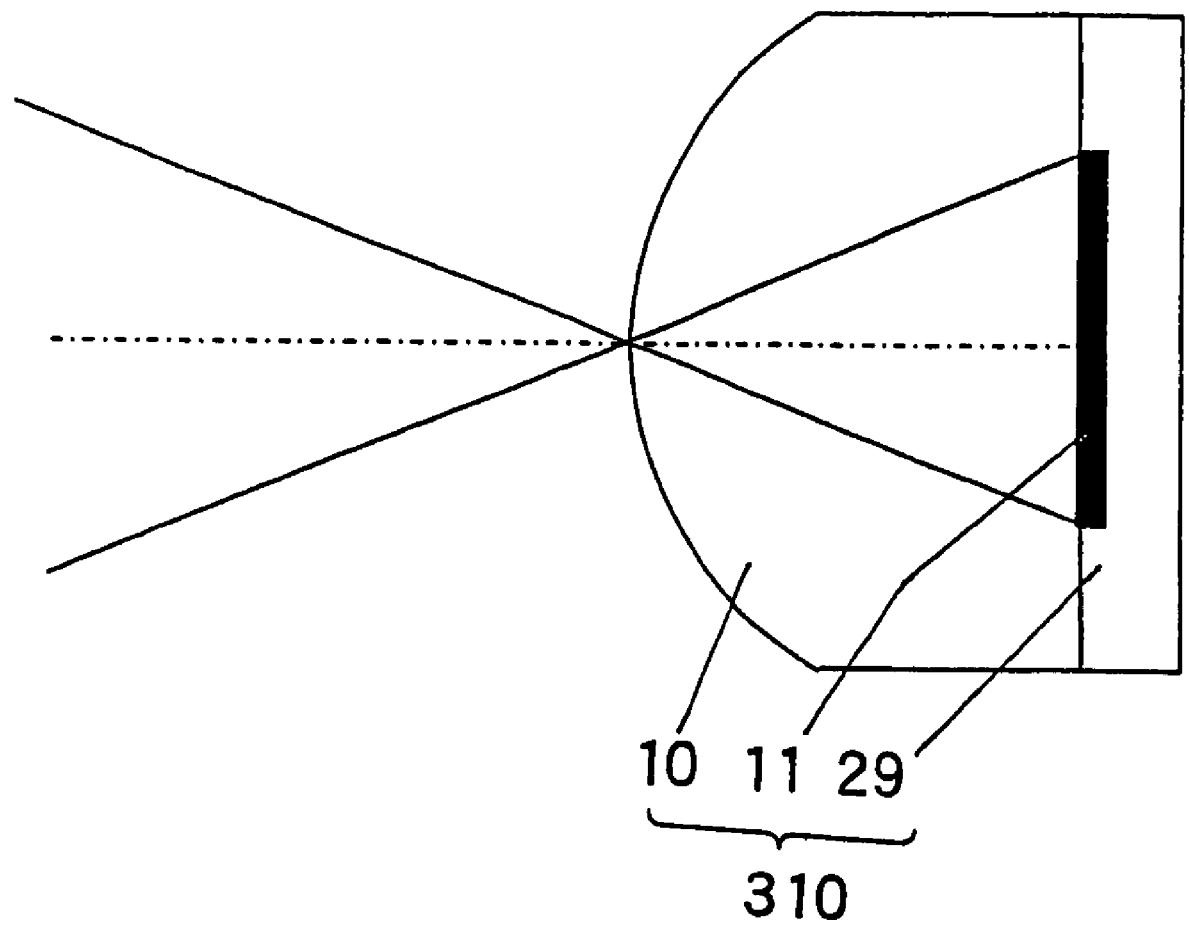
FIG. 8 is a sectional view of an imaging pixel.

FIG. 8 is a sectional view of an imaging pixel 310. The micro-lens 10 is set to the front of the imaging photoelectric conversion unit 11 at the imaging pixel 310 and, as a result, an image of the photoelectric conversion unit 11 is projected frontward via the micro-lens 10. The photoelectric conversion unit 11 is formed on a semiconductor circuit substrate 29, with a color filter (not shown) disposed between the micro-lens 10 and the photoelectric conversion unit 11.

Figure 9:
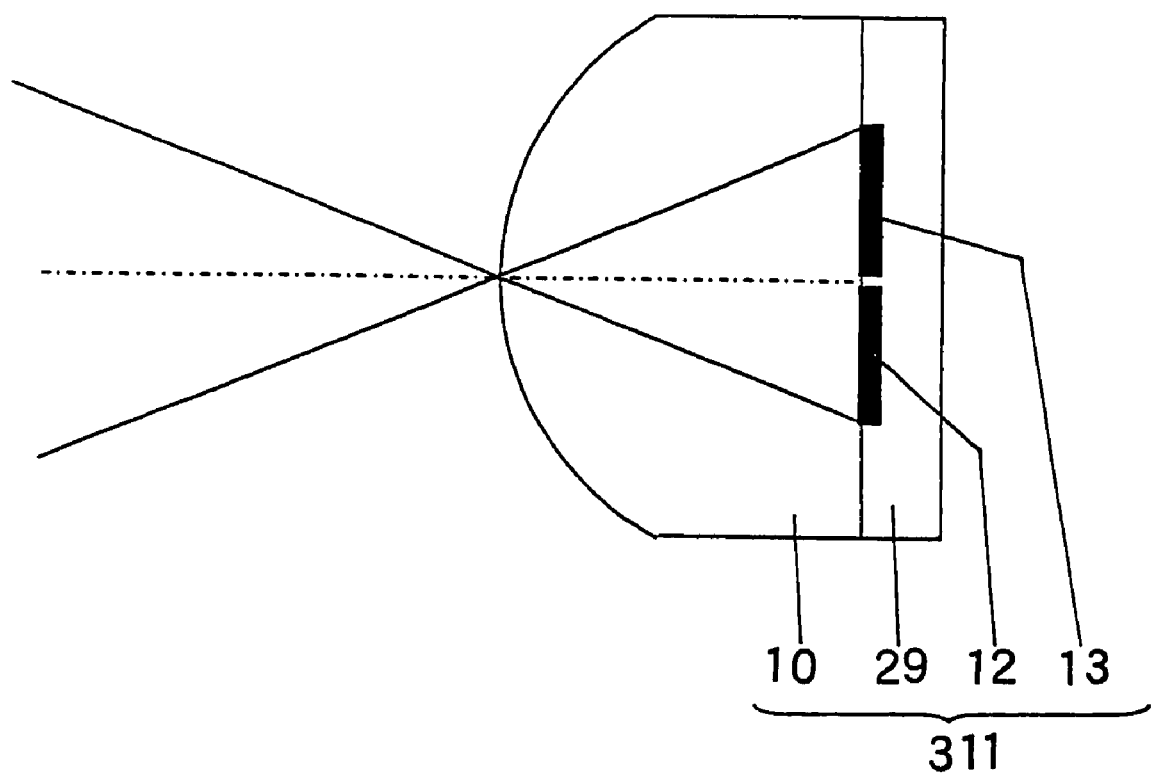
FIG. 9 is a sectional view of a focus detection pixel.

FIG. 9 is a sectional view of a focus detection pixel 311. In the focus detection pixel 311, the micro-lens 10 is disposed to the front of the photoelectric conversion units 12 and 13 used for focus detection and thus, images of the photoelectric conversion units 12 and 13 are projected frontward via the micro-lens 10. The photoelectric conversion units 12 and 13 are formed on the semiconductor circuit substrate 29.

Figure 10:
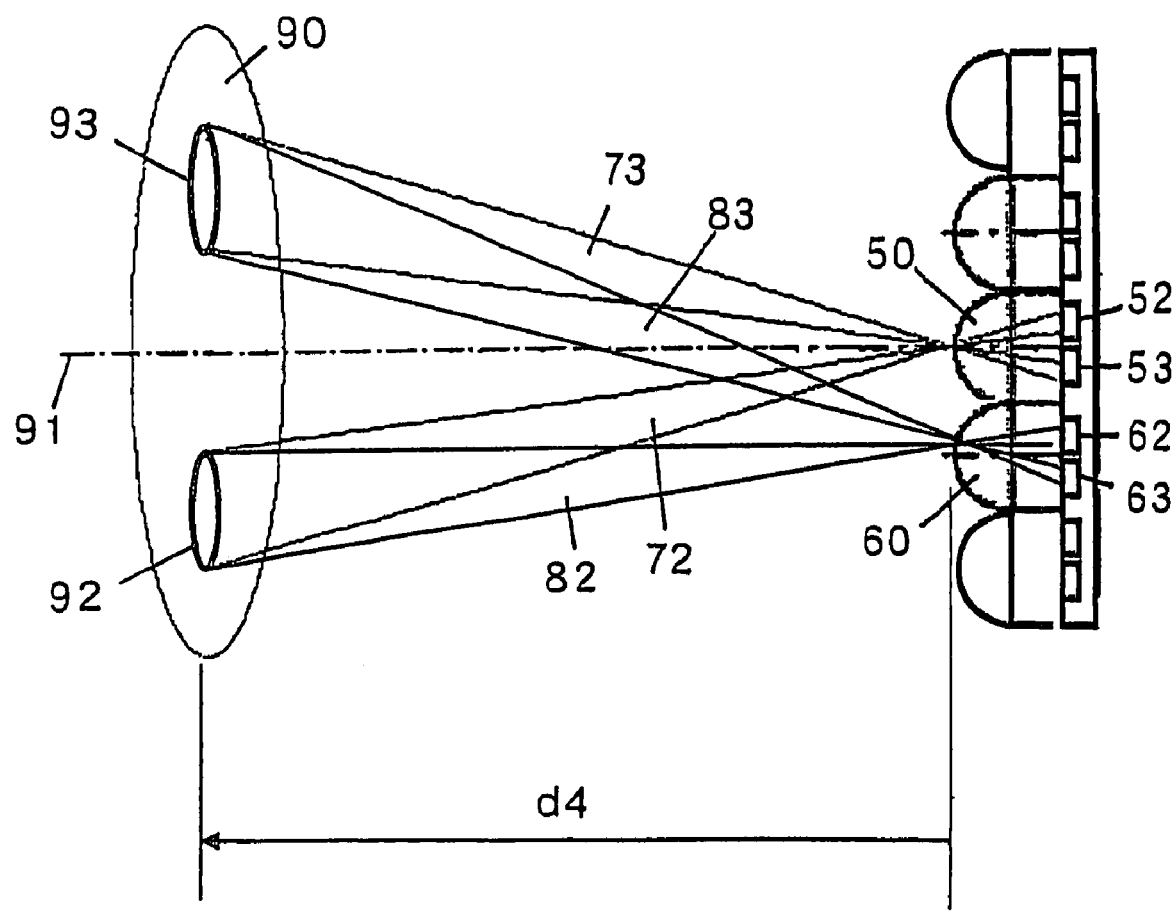
FIG. 10 illustrates focus detection executed through a split-pupil method.

Next, in reference to FIG. 10, focus detection executed by adopting a split-pupil method (a pupil division-type method) is explained. FIG. 10 shows a micro-lens 50 of a focus detection pixel 311 disposed on an optical axis 91 of the exchangeable lens 202, a pair of photoelectric conversion units 52 and 53 disposed to the rear of the micro-lens 50, a micro-lens 60 of a focus detection pixel 311 disposed off the optical axis 91 of the exchangeable lens 202 and a pair of photoelectric conversion units 62 and 63 disposed to the rear of the microlens 60. An exit pupil 90 of the exchangeable lens 202 is set at a position assumed over a distance d4 to the front of the micro-lenses 50 and 60 disposed on the predetermined imaging plane of the exchangeable lens 202. The distance d4 takes a value determined in correspondence to the curvature and the refractive index of the micro-lenses 50 and 60, the distance between the micro-lenses 50 and 60 and the photoelectric conversion units 52/53 and 62/63 and the like. In the description, the distance d4 is referred to as a range-finding pupil distance.

The micro-lenses 50 and 60 are set at the predetermined imaging plane of the exchangeable lens 202. The shapes of the pair of photoelectric conversion units 52 and 53 are projected via the micro-lens 50 set on the optical axis 91 onto the exit pupil 90 set apart from the micro-lens 50 by the projection distance d4, and the projected shapes define range-finding pupils 92 and 93. The shapes of the pair of photoelectric conversion units 62 and 63 are projected via the micro-lens 60 set off the optical axis 91 onto the exit pupil 90 set apart by the projection distance d4, and the projected shapes define the range-finding pupils 92 and 93. Namely, the projecting direction for each pixel is determined so that the projected shapes (range-finding pupils 92 and 93) of the photoelectric conversion units in the individual pixels are aligned on the exit pupil 90 set over the projection distance d4.

The photoelectric conversion unit 52 outputs a signal corresponding to the intensity of an image formed on the micro-lens 50 with a focus detection light flux 72 having passed through the range-finding pupil 92 and having advanced toward the micro-lens 50. The photoelectric conversion unit 53 outputs a signal corresponding to the intensity of an image formed on the micro-lens 50 with a focus detection light flux 73 having passed through the range-finding pupil 93 and having advanced toward the micro-lens 50. Also, the photoelectric conversion unit 62 outputs a signal corresponding to the intensity of an image formed on the micro-lens 60 with a focus detection light flux 82 having passed through the range-finding pupil 92 and having advanced toward the micro-lens 60. The photoelectric conversion unit 63 outputs a signal corresponding to the intensity of an image formed on the micro-lens 60 with a focus detection light flux 83 having passed through the range-finding pupil 93 and having advanced toward the micro-lens 60. It is to be noted that the focus detection pixels 311 are arrayed in a direction matching the direction along which the pair of range-finding pupils are separated from each other.

Many focus detection pixels each structured as described above are arranged in a straight row and the outputs from the pairs of photoelectric conversion units at the individual pixels are integrated into output groups each corresponding to one of the two range-finding pupils 92 and 93. Thus, information related to the intensity distribution of the pair of images formed on the focus detection pixel row with the individual focus detection light fluxes passing through the pair of range-finding pupils 92 and 93 is obtained. Next, image shift detection calculation processing (correlation processing, phase difference detection processing) to be detailed later is executed by using the information thus obtained so as to detect the extent of image shift (image misalignment) manifested by the pair of images through the split-pupil detection method. The image shift quantity (the image misalignment quantity) indicating the extent of image shift (image misalignment) is then multiplied by a predetermined conversion coefficient and, as a result, the extent of deviation (defocus amount) of the current imaging plane (the imaging plane on which the image is formed at the focus detection position corresponding to a specific micro-lens array position on the predetermined imaging plane) relative to the predetermined imaging plane is calculated.

It is to be noted that FIG. 10 schematically shows the focus detection pixel (the micro-lens 50 and the pair of photoelectric conversion units 52 and 53) disposed on the optical axis 91 and the adjacent focus detection pixel (the micro-lens 60 and the pair of photoelectric conversion units 62 and 63). At each of the other focus detection pixels, too, the light fluxes arriving at the micro-lens from the pair of range-finding pupils are received at the pair of photoelectric conversion units.

Figure 11:
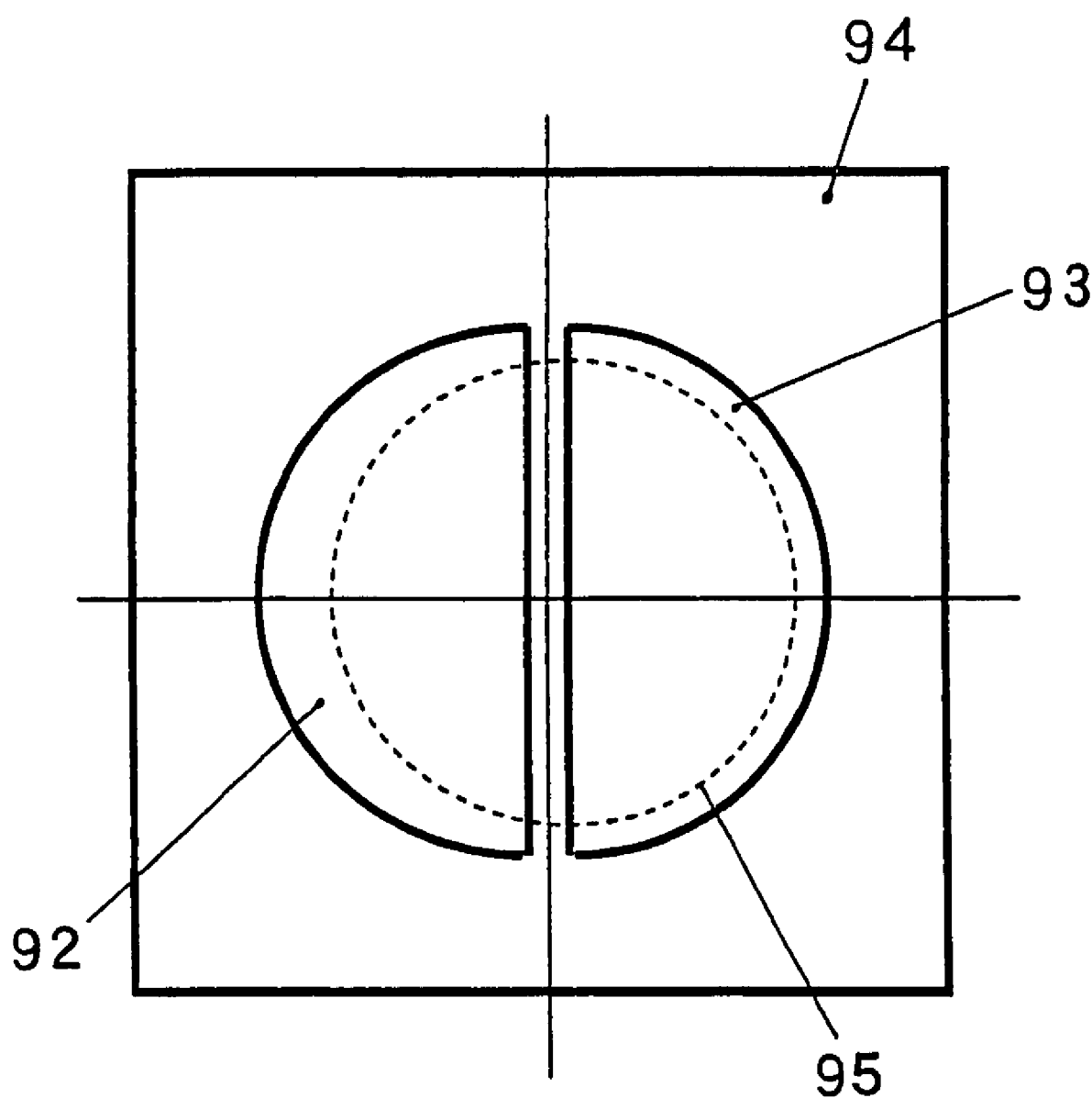
FIG. 11 is a front view, showing the relationship between the projection areas achieved at the exit pupil plane.

FIG. 11 is a front view, showing the relationship between the projection areas at the exit pupil plane. The circle circumscribing the range-finding pupils 92 and 93 formed by projecting the pair of photoelectric conversion units 12 and 13 in the focus detection pixel 311 onto the exit pupil plane 90 via the micro-lens 10, viewed from the imaging plane, assumes a specific opening F value (referred to as a range-finding pupil F value in this description. F 2.8 in this example). The photoelectric conversion unit 11 in each imaging pixel 310 is projected onto the exit pupil plane 90 over an area 94 via the micro-lens 10. The area 94 is large enough to contain both the range-finding pupils 92 and 93.

Since the positional relationship between the center of an area 95 corresponding to the aperture opening at the exchangeable lens 202, indicated by the dotted line, and the center of the circle circumscribing the range-finding pupils 92 and 93 in FIG. 11 changes in correspondence to the position of the exit pupil inherent to the exchangeable lens 202 and the position of the focus detection pixel on the image plane (the distance from the optical axis), the center of the area 95 and the center of the circumscribing circle do not necessarily match. If the area of the exit pupil of the exchangeable lens 202 is smaller than the area of the circle circumscribing the range-finding pupils 92 and 93 and the centers do not match, the light fluxes passing through the pair of range-finding pupils 92 and 93 become unevenly "eclipsed". In such a case, since the quantities of light in the pair of images formed with these light fluxes do not match, distortion occurs.

Figure 12:
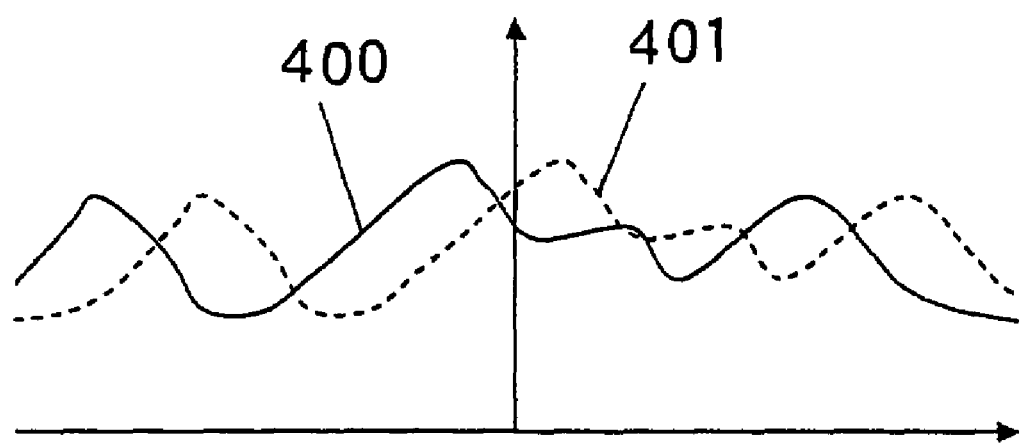
FIGS. 12A and 12B each present a graph with the intensity distribution (light quantities) of a pair of image signals at a given focus detection position indicated along the vertical axis and the positional deviation manifesting within the focus detection position indicated along the horizontal axis.
Figure 12:
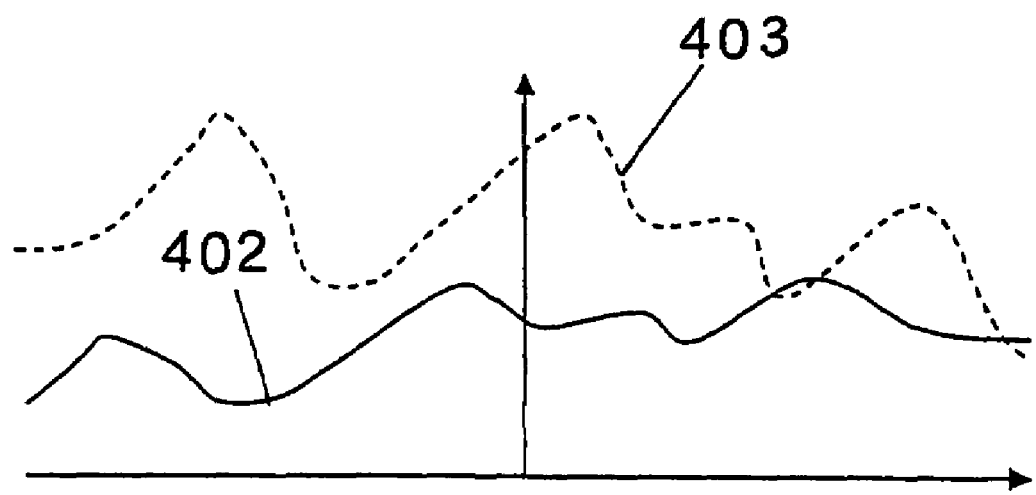

FIGS. 12A and 12B each present a graph with the intensity distribution (light quantities) of a pair of image signals at a given focus detection position indicated along the vertical axis and the positional deviation occurring within the focus detection position indicated along the horizontal axis. The term "positional deviation occurring within the focus detection position" refers to the positions assumed by a plurality of focus detection pixels belonging to one of the focus detection positions on, for instance, the image sensor 211 shown in FIG. 3. A pair of image signals 400 and 401, output when there is no eclipse of the focus detection light fluxes, are represented by identical image signal functions, which are simply shifted relative to each other along the horizontal direction, as shown in FIG. 12A. However, if an eclipse of the focus detection light fluxes occurs, the quantities of focus detection light fluxes passing through the range-finding pupils change in correspondence to the focus detection position and the positional deviation occurring within the focus detection position and, as a result, a pair of image signals 402 and 403, output to include gains and offsets relatively different from each other under such circumstances, as shown in FIG. 12B, are not identical signals shifted relative to each other.

(Imaging Operation)

Figure 13:
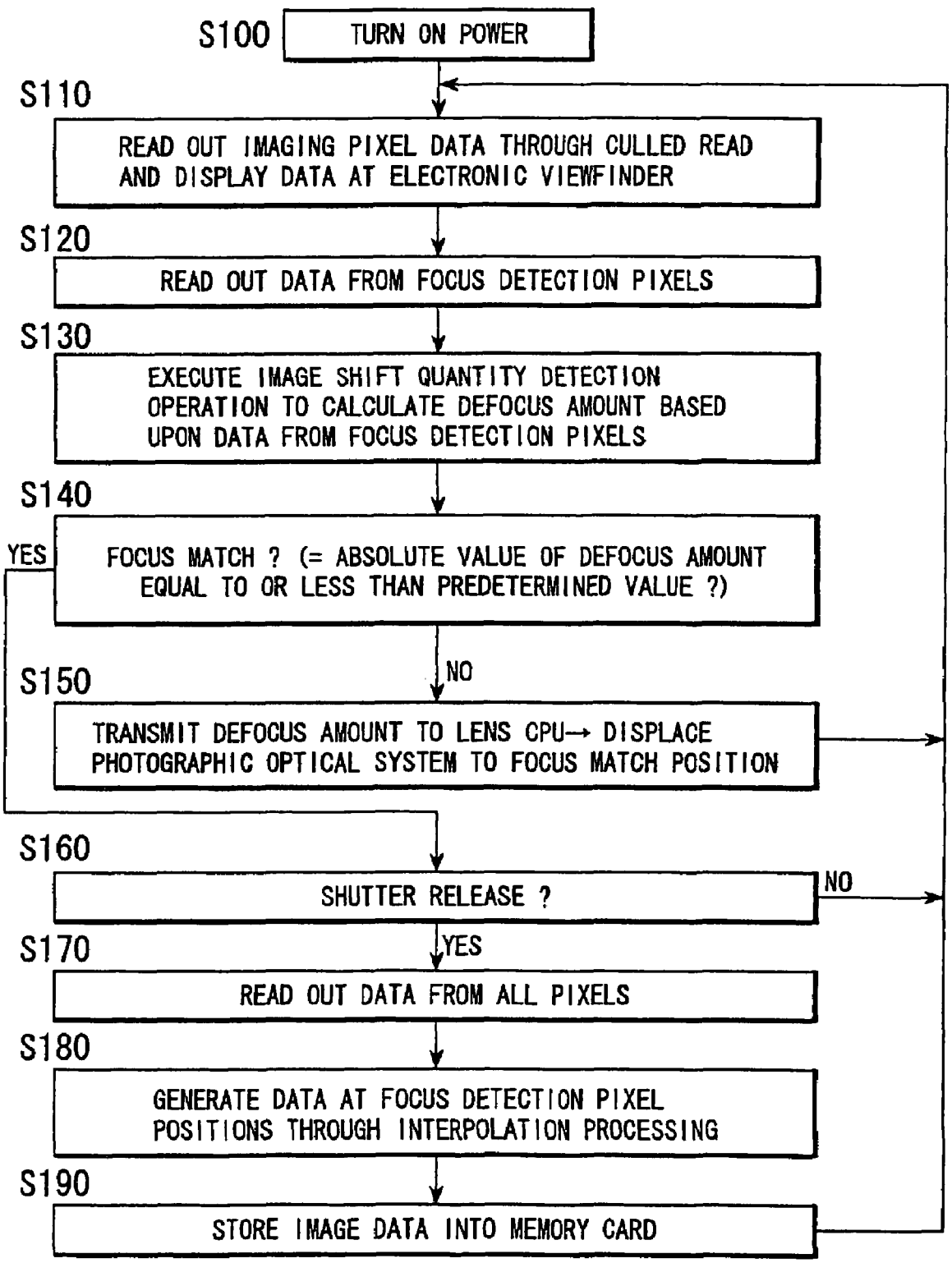
FIG. 13 presents a flowchart of the imaging operation executed in the digital still camera (imaging device) achieved in the embodiment.

FIG. 13 presents a flowchart of the imaging operation executed in the digital still camera (imaging device) 210 achieved in the embodiment. The camera drive control device 212 repeatedly executes the imaging operation after the power to the camera is turned on in step 100. In step 110, a culled read of the data from the imaging pixels 310 is executed and the data thus read out through the culled read are displayed at the electronic viewfinder LCD 215. The number of sets of data from the focus detection pixels 311 read out through the culled read of the data from the imaging pixels 310 should be minimized, so as to assure better display quality. As an alternative, data from the focus detection pixels 311 may be read out through the culled read and the focus detection pixel outputs in an uncorrected form may be displayed on the electronic viewfinder LCD 215 so as to enable the user to identify the focus detection position with ease.

In step 120, data are read out from the focus detection pixel row. It is to be noted that since a specific-area among the focus detection areas G1~G5 in FIG. 2 will have been already selected via an area selecting operation member (not shown), the data are read from the focus detection pixel row corresponding to the selected focus detection area. In the following step 130, an image shift detection operation processing, i.e., correlation operation processing, to be detailed later, is executed based upon the pair of sets of image data corresponding to the particular focus detection pixel row, so as to calculate the image shift quantity indicating the extent of image shift and then to calculate the defocus amount indicating the extent of defocusing. In step 140, a decision is made as to whether or not the current condition is close to a focus match state, i.e., whether or not the absolute value of the defocus amount having been calculated is equal to or less than a focus match decision-making reference value.

If it is decided that the current condition is not close to the focus match state, the operation proceeds to step 150 to transmit the calculated defocus amount to the lens drive control device 209 which then drives the focusing lens 207 at the exchangeable lens 202 to the focus match position. Then, the operation returns to step 110 to repeatedly execute the operation described above. It is to be noted that the operation also branches to step 150 if focus detection is not possible to transmit a scan drive instruction to the lens drive control device 209. In response, the lens drive control device 209 drives the focusing lens 207 at the exchangeable lens 202 to scan between the infinity position and the close-up position. Then the operation returns to step 110 to repeatedly execute the operation described above.

If, on the other hand, it is decided that the current condition is close to the focus match state, the operation proceeds to step 160 to make a decision as to whether or not a shutter release has occurred in response to an operation of the shutter release button (not shown). If it is decided that a shutter release has not yet occurred, the operation returns to step 110 to repeatedly execute the operation described above. If it is decided that a shutter release has occurred, the operation proceeds to step 170 to transmit an aperture adjustment instruction to the lens drive control device 209. In response, the aperture 208 at the exchangeable lens 202 is set to a control F value determined by the camera drive control device 212 through exposure calculation or to an F value manually selected by the user.

Upon completing the aperture control, the image sensor 211 is engaged in an imaging operation and image data are read out from the imaging pixels 310 and all the focus detection pixels 311 at the image sensor 211. In step 180, image data at positions assumed by the individual pixels in the focus detection pixel rows are interpolated based upon the data at the focus detection pixels 311 and the data at surrounding imaging pixels 310. In step 190, image data constituted with the data at the imaging pixels 310 and the interpolated data at the focus detection pixel positions are saved into the memory card 213, and then the operation returns to step 110 to repeatedly execute the operation described above.

(Focus Detection Operation)

Figure 14:
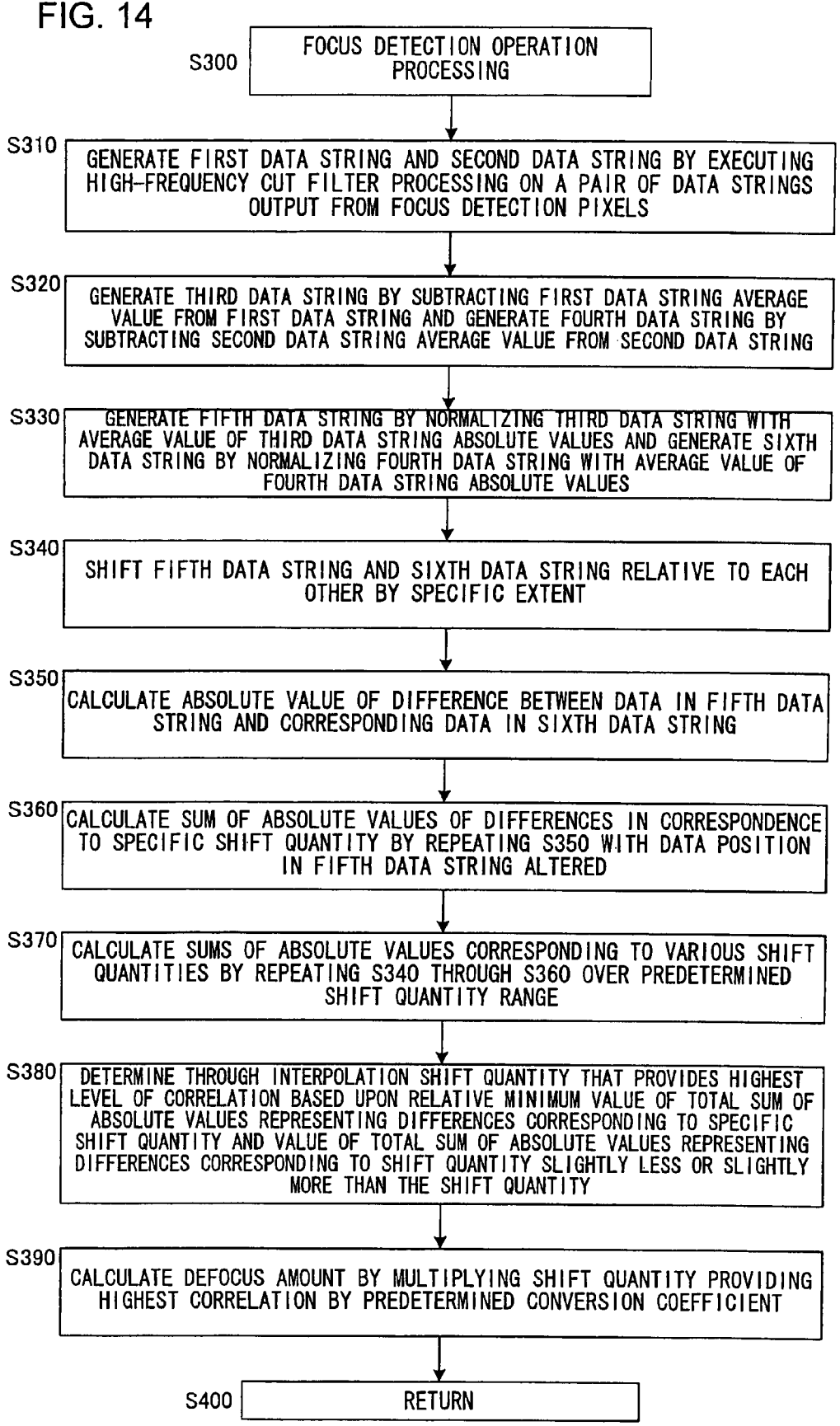
FIG. 14 presents a detailed flowchart of the focus detection operation executed in step 130 shown in FIG. 13 as part of the imaging operation.

FIG. 14 presents a detailed flowchart of the focus detection operation executed in step 130 in FIG. 13 as part of the imaging operation. After starting the focus detection operation processing, i.e., the correlation operation processing, in step 300, the operation proceeds to step 310 to execute high-frequency cut filter processing such as that expressed in (1) below on a pair of signal data strings ($\alpha_1 \sim \alpha_M$ and $\beta_1 \sim \beta_M$: M indicates the number of sets of data) output from a focus detection pixel row thereby generating a first signal data string $\alpha_1 \sim \alpha_N$ and the second signal data string $\beta_1 \sim \beta_N$ (N indicates the number of sets of data) from which the noise component and the high frequency component bound to adversely affect correlation processing are eliminated.

$$a_n = \alpha_n + 2 \times \alpha_{n+1} + \alpha_{n+2},$$

$$b_n = \beta_n + 2 \times \beta_{n+1} + \beta_{n+2} \quad (1)$$

In expression (1), n=1~N. It is to be noted that the high-frequency cut filter processing in step 310 may be skipped if the arithmetic operation needs to be completed faster or if the extent of defocusing is already significant and thus it is obvious that only a very small high-frequency component is present.

In step 320, average values ax and bx of the first signal data string $a_1 \sim a_N$ and the second signal data string $b_1 \sim b_N$ are subtracted from each set of data in the first signal data string and each set of data in the second signal data string, thereby generating a third signal data string $a'_1 \sim a'_N$ and a fourth signal data string $b'_1 \sim b'_N$.

$$ax = (\Sigma a_n)/N$$

$$bx = (\Sigma b_n)/N \quad (2),$$

$$a'_n = a_n - ax$$

$$b'_n = b_n - bx \quad (3)$$

In expressions (2) and (3), n=1~N. As detailed later, by subtracting the average values, the correlation between the third signal data string and the fourth signal data string can be accurately detected through the correlation operation processing even when an offset difference has occurred between the first signal data string and the second signal data string.

In step 330, the third signal data string $a'_1 \sim a'_N$ and the fourth signal data string $b'_1 \sim b'_N$ are respectively divided by average values ay and by, each obtained by averaging the absolute values of the data values in the respective data string, thereby generating a fifth signal data string $A_1 \sim A_N$ and a sixth signal data string $B_1 \sim B_N$.

$$ay = (\Sigma |a'_n|)/N$$

$$by = (\Sigma |b'_n|)/N \quad (4),$$

$$A_n = a'_n/ay$$

$$B_n = b'_n/by \quad (5)$$

In expressions (4) and (5), n=1~N. As described in detail later, by dividing the data in the third signal data string and the fourth signal data string by the corresponding average values of the absolute values, the relative gain in the resulting fifth signal data string and sixth signal data string is normalized, which makes it possible to accurately detect the correlation between the fifth signal data string and the sixth signal data string through correlation operation processing.

In step 340, the sixth signal data string $B_1 \sim B_N$ is shifted relative to the fifth signal data string $A_1 \sim A_N$ by a predetermined extent k in order to determine through an arithmetic operation the correlation quantity indicating the degree or level of correlation between the fifth signal data string $A_1 \sim A_N$ and the sixth signal data string $B_1 \sim B_N$ at the shift quantity k (k is an integer). In step 350, the absolute value representing the difference between data in the fifth signal data string and the corresponding data in the sixth signal data string is calculated. The results of this calculation indicates the degree or level of correlation (similarity degree or level) existing between the fifth signal data string and the sixth signal data string. In the following step 360, the processing in step 350 is repeated with the position of the fifth signal data string shifted so as to cumulatively add the results of the calculation indicating the correlation degree obtained by executing step 350 and thus, the correlation quantity C(k) corresponding to the specific shift quantity k is calculated.

In step 370, the processing in steps 340 through 360 is repeatedly executed with the shift quantity k altered over a predetermined range and data indicating the correlation quantity C(k) with regard to the shift quantity k are obtained through calculation. The correlation quantity C(k) that is ultimately obtained is expressed as in (6) below.

$$C(k) = \Sigma |A_n - B_{n+k}| \quad (6)$$

In expression (6), the $\Sigma$ operation is cumulatively executed with regard to n. In addition, the shift quantity k is an integer which represents a relative shift quantity assuming a value taken in units matching the detection pitch with which the pair of sets of data is detected.

Figure 15:
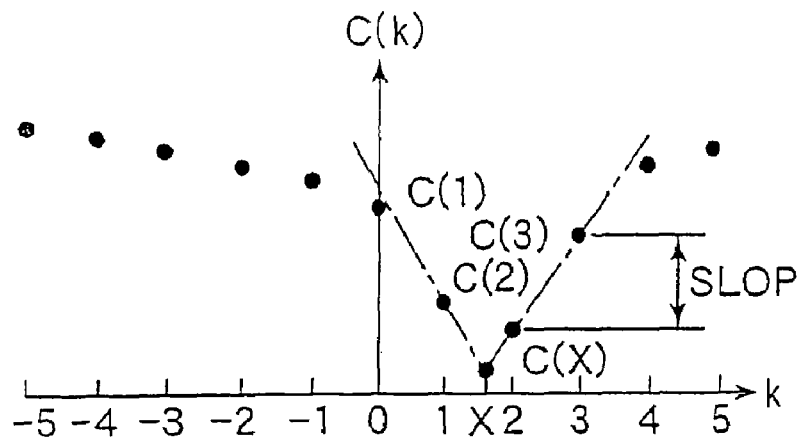
FIGS. 15A, 15B and 15C illustrate how the focus detection operation (correlation operation) is executed.
Figure 15:
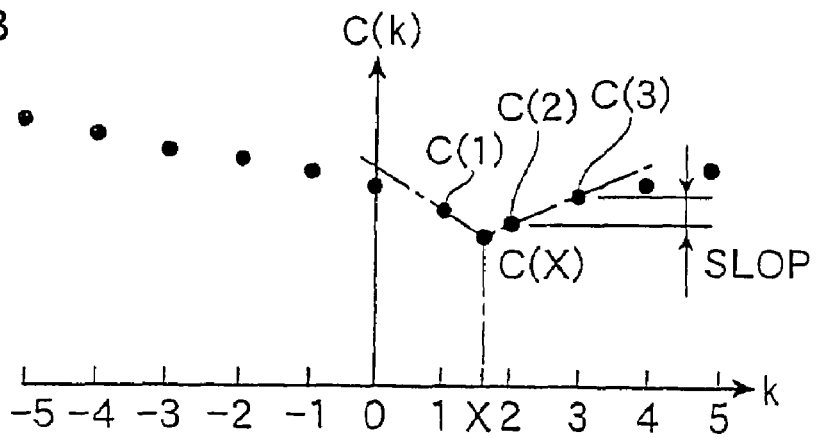
Figure 15:
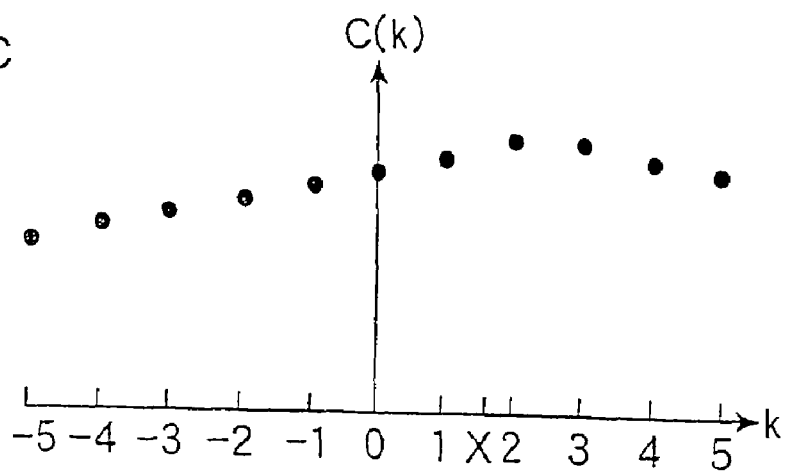

The results of the arithmetic operation executed as expressed in (6) may indicate that the correlation quantity C(k) assumes the smallest value (the smaller the value, the higher the correlation degree) at the shift quantity k=kj=2 at which the pair of sets of data achieve a high degree of correlation as shown in FIG. 15A. In other words, FIG. 15A shows an extremal value (an extremum) that is a relative minimum value obviously recognized. It should be noted that in case that the sign of correlation quantity C(k) is reversed, FIG. 15A shows a relative maximum value. In step 380, the shift quantity x, which gives the smallest value C(x) in the continuous correlation quantity graph is determined by adopting a three-point interpolation method expressed in (7)~(10) below.

$$x = kj + D/SLOP \quad (7)$$

$$C(x) = C(kj) - |D| \quad (8)$$

$$D = \{C(kj-1) - C(kj+1)\}/2 \quad (9)$$

$$SLOP = \text{MAX}\{C(kj+1) - C(kj), C(kj-1) - C(kj)\} \quad (10)$$

In step 390, a defocus amount DEF indicating the extent of defocusing of the subject image plane relative to the predetermined imaging plane is determined as expressed in (11) below in correspondence to the shift quantity x determined as expressed in (7).

$$DEF = KX \cdot PY \cdot x \quad (11)$$

PY in expression (11) represents the detection pitch, whereas KX in expression (11) represents the conversion coefficient that is determined in correspondence to the opening angle formed with the gravitational centers of the pair of range-finding pupils. The judgment as to whether or not the calculated defocus amount DEF is reliable is made as follows. As shown in FIG. 15B, the interpolated minimum value C(x) of the correlation quantity increases when the degree of correlation between the pair of sets of data is low. Accordingly, if C(x) is equal to or greater than a predetermined value, the defocus amount is judged to be less reliable. Alternatively, C(x) may be standardized with regard to the data contrast, and in such a case, if the value obtained by dividing C(x) by SLOP indicating a value in proportion to the contrast is equal to or greater than a predetermined value, the defocus amount should be judged to be not reliable. As a further alternative, if SLOP indicating the value in proportion to the contrast is equal to or less than a predetermined value, the subject should be judged to be a low contrast subject and, accordingly, the reliability of the calculated defocus amount DEF should be judged to be low.

If the degree of correlation between the pair of sets of data is low and the correlation quantity C(k) does not dip at all over the shift range kmin to kmax, as shown in FIG. 15C, the minimum value C(x) cannot be determined. Under such circumstances, it is judged that the focus detection is disabled. If, on the other hand, focus detection is possible, the defocus amount is calculated by multiplying the image shift quantity having been calculated by the predetermined conversion coefficient. In step 400, the focus detection operation processing (correlation operation processing) ends and the operation makes a return.

(Correlation Operation)

Next, an embodiment of the correlation operation processing shown in FIG. 14 is described. FIGS. 16A and 16B illustrate the concept of the correlation operation executed in the embodiment with FIG. 16A showing one of the data strings and FIG. 16B showing the other data string. An offset difference and a gain difference (difference in the signal amplitude) attributable to, for instance, an eclipse at the exchangeable lens 202 have manifested in a first signal data string 501 and a second signal data string 601. The shift quantity obtained by executing a correlation operation directly on the first signal data string 501 and the second signal data string 601 would not be very accurate and in some cases, detection of the shift quantity itself would not be possible.

In FIGS. 16A and 16B, the shift quantity is respectively represented by the average value ax corresponding to the first signal data string 501 and the average value bx corresponding to the second signal data string 601 and thus, it assumes different values. The offset is canceled in a third signal data string 502 and a fourth signal data string 602 respectively generated by subtracting the average values ax and bx from the corresponding signal data strings, i.e., the first signal data string 501 and the second signal data string 601. The gain difference still present in the third signal data string 502 and the fourth signal data string 602 can then be canceled by dividing the third signal data string 502 by the average value ay of the absolute values of the data in the third signal data string 502 and thus generating a fifth signal data string 503 and by dividing the fourth signal data string 602 by the average value by of the absolute values of the data in the fourth signal data string 602 and thus generating a sixth signal data string 603.

The shift quantity indicating the extent of shifting between the first signal data string 501 and the second signal data string 601 manifesting the offset difference and the gain difference can be detected with a high degree of accuracy by determining a shift quantity at which a high degree of correlation is achieved through correlation detection executed while the fifth signal data string 503 and the sixth signal data string 603, in which the offset difference and the gain difference are canceled, relative to each other. Any of various types of arithmetic operation processing may be executed as the correlation operation processing on the fifth signal data string 503 and the sixth signal data string 603, and examples of such arithmetic operation processing are explained below.

Correlation Operation Processing Example 1

The correlation quantity C(k) is determined as expressed in (12) below.

$$C(k)=\Sigma|A_n-B_{n+k}| \quad (12)$$

Expression (12) is identical to the expression (6). In expression (12), the $\Sigma$ operation is executed cumulatively for n, and the range assumed for n is limited to the range over which the data $A_n$ and $B_{n+k}$ are present in correspondence to the shift quantity k.

Figure 17:
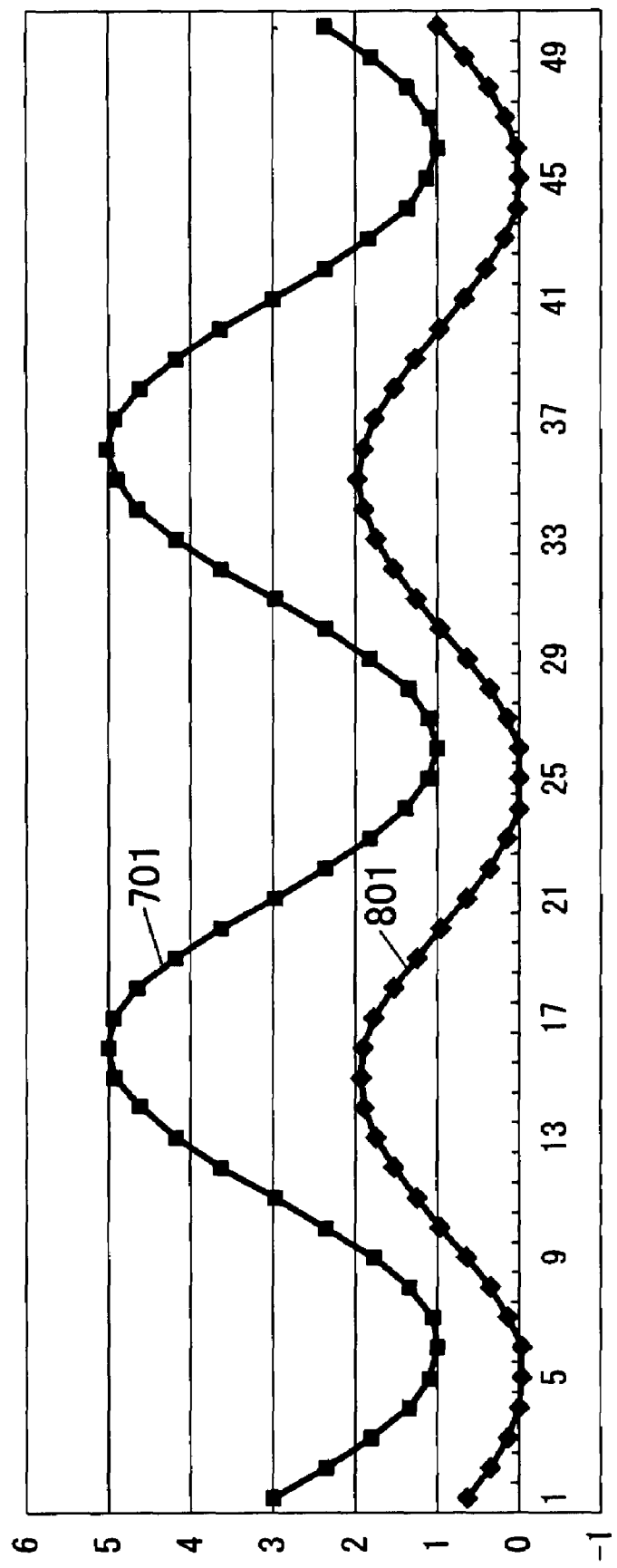
FIG. 17 shows a pair of image signal data strings to undergo the correlation operation in correlation operation processing example 1 of the embodiment.
Figure 18:
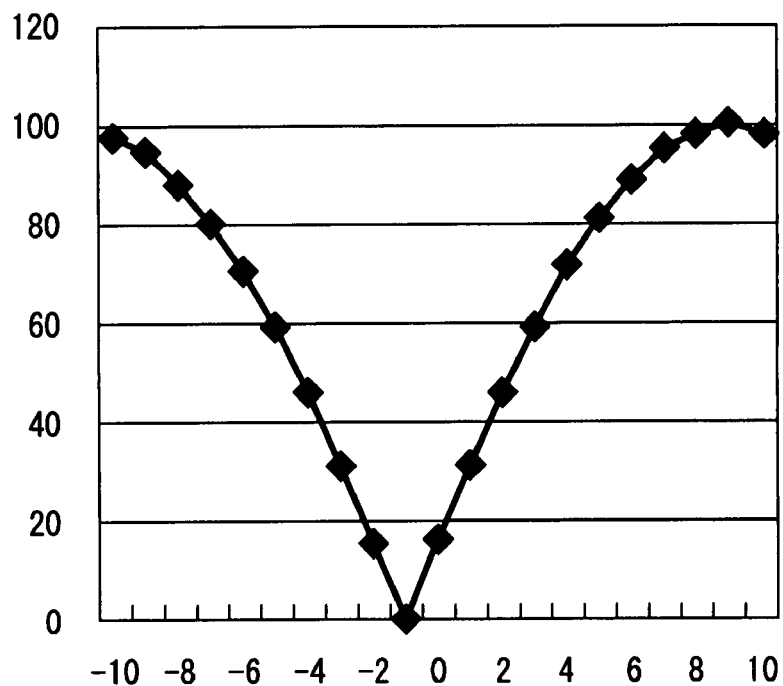
FIG. 18 presents the results achieved by first executing the processing for canceling the offset difference and the gain difference in the embodiment and then executing correlation operation processing example 1 on the pair of image signal data strings.

Now let us consider the correlation operation in correlation operation processing example 1 executed on a pair of image signal data strings 701 and 801 such as those shown in FIG. 17. Two image functions (2*sin ω+3) and (sin ω+1) with a gain difference of a factor of 2 and an offset of 2 are set as a pair of image signal data strings $(a_1, a_2 \ldots a_n)$ and $(b_1, b_2 \ldots b_n)$ output from the image sensor 211. In correspondence to this pair of image signal data strings 701 and 801, signal data strings are generated, from which the offset difference and the gain difference are eliminated, through the processing explained earlier. FIG. 18 presents the results of the correlation operation in correlation operation processing example 1 executed on these two signal data strings. As FIG. 18 clearly indicates, a high degree of correlation is achieved at an obvious dip in the graph by executing the correlation-operation in correlation operation processing 1, although a gain difference and an offset difference manifest in the initial two signal data strings 701 and 801.

Figure 19:
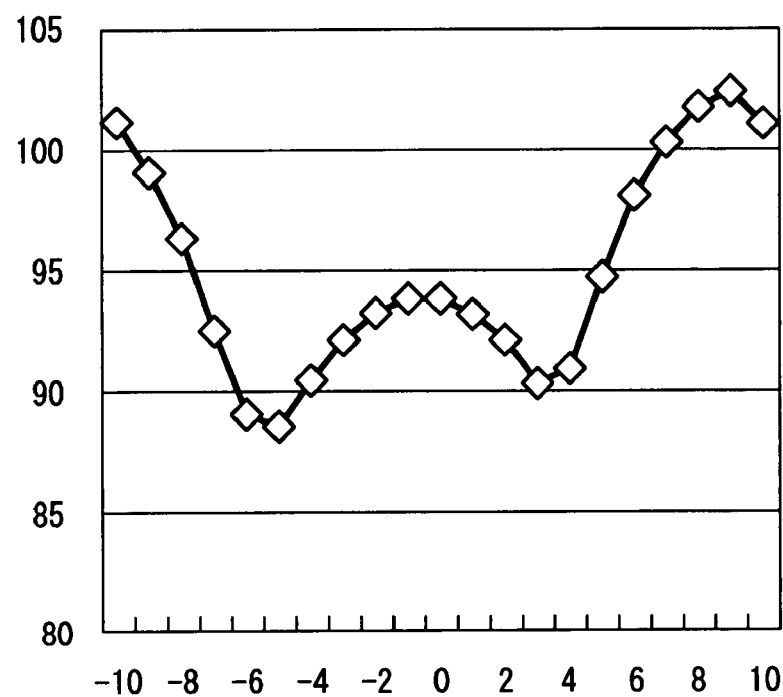
FIG. 19 presents the results of correlation operation processing example 1 executed on the pair of image signal data strings without first executing the processing for canceling the offset difference and the gain difference in the embodiment.

FIG. 19 presents the results obtained by executing correlation operation processing example 1 directly on the pair of image signal data strings 701 and 801. As the figure clearly indicates, the correlation graph of the correlation between the two signal data strings 701 and 801 manifesting a gain difference and an offset does not dip at a position corresponding to the correct shift quantity, indicating that correlation detection is not possible.

Correlation Operation Processing Example 2

The correlation quantity C(k) is determined as expressed in (13) below.

$$C(k)=\Sigma|\text{MIN}(A_n,B_{n+k})| \quad (13)$$

In expression (13), the $\Sigma$ operation is executed cumulatively for n, and the range assumed for n is limited to the range over which the data $A_n$ and $B_{n+k}$ are present in correspondence to the shift quantity k. In addition, either the data $A_n$ and the data $B_{n+k}$ within the parentheses, indicating a smaller value, are selected through the MIN function. Since the correlation quantity C(k) peaks at a position at which a high correlation degree is achieved, the shift quantity is detected based upon the correlation quantity peak position through this correlation operation processing.

Correlation Operation Processing Example 3

The correlation quantity C(k) is determined as expressed in (14) below.

$$C(k)=\Sigma|\text{MAX}(A_n,B_{n+k})| \tag{14}$$

In expression (14), the Σ operation is executed cumulatively for n, and the range assumed for n is limited to the range over which the data $A_n$ and $B_{n+k}$ are present in correspondence to the shift quantity k. In addition, either the data $A_n$ or the data $B_{n+k}$ within the parentheses indicating a larger value are selected through the max function. Since the correlation quantity C(k) dips at a position at which a high correlation degree is achieved, the shift quantity is detected based upon the correlation quantity dipped position through this correlation operation processing.

Correlation Operation Processing Example 4

The correlation quantity C(k) is determined as expressed in (15) below.

$$C(k)=\Sigma|(A_n\times B_{n+1+k})-(B_{n+k}\times A_{n+1})| \tag{15}$$

Figure 20:
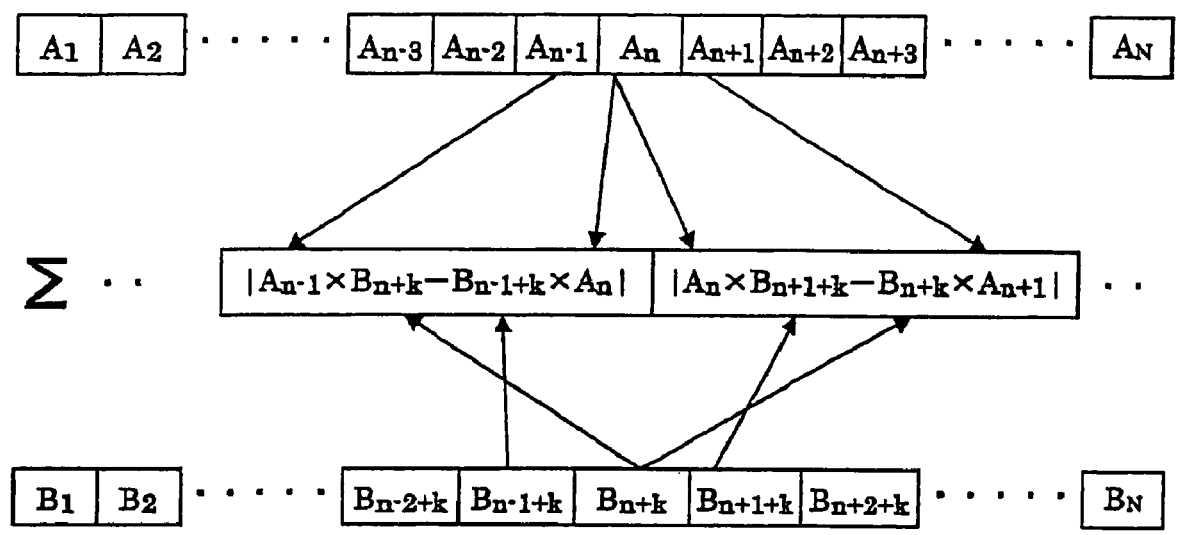
FIG. 20 shows the data flow in correlation operation processing example 4.

In expression (15), a Σ operation is executed cumulatively for n, and the range assumed for n is limited to the range over which the data $A_n$, $A_{n+1}$, $B_{n+k}$ and $B_{n+1+k}$ are present in correspondence to the shift quantity k. FIG. 20 shows the data flow in correlation operation processing example 4. In processing example 4, first operation data $(A_n \times B_{n+k})$ are obtained by multiplying the target data $A_n$ in the fifth signal data string A by a data $B_{n+1+k}$ offset by one data position from the data $B_{n+k}$ in the sixth signal data string B shifted by the shift quantity k, which corresponds to the target data $A_n$ and second operation data $(B_{n+k} \times A_{n+1})$ are obtained by multiplying the data $B_{n+k}$ in the sixth signal data string B by the data $A_{n+1}$ offset by one data position from the target data $A_n$ in the first signal data string A. Then, the correlation quantity C(k) with regard to the fifth signal data string A and the sixth signal data string B is determined by calculating the total sum of the absolute values of the differences between the first operation data and the second operation data.

Correlation Operation Processing Example 5

The correlation quantity C(k) is determined as expressed below.

$$C(k)=\Sigma|(A_n\times B_{n+2+k})-(B_{n+k}\times A_{n+2})| \tag{16}$$

In expression (16), the Σ operation is cumulatively executed for n and the range assumed for n is limited to the range over which the data $A_n$, $A_{n+2}$, $B_{n+k}$ and $B_{n+2+k}$ are present in correspondence to the shift quantity k. The correlation operation in correlation operation processing example 5 is executed by using a wider range of data compared to the range of data used in correlation operation processing example 4 expressed in (15). In addition to the advantages achieved through correlation operation processing 4, correlation operation processing example 5, in which the data $B_{n+2+k}$ and the data $A_{n+2}$, offset by two data positions from the target data $B_{n+k}$ and $A_n$ are used in the arithmetic operations and thus, a wider range of data is used for the arithmetic operations, reduces the adverse effects of the high frequency component and noise contained in the signal data strings, resulting in improved anti-noise performance.

Correlation Operation Processing Example 6

The correlation quantity C(k) is determined as expressed below.

$$C(k)=\Sigma|(A_n^2\times B_{n-1+k}\times B_{n+1+k})-(B_{n+k}^2\times A_{n-1}\times A_{n+1})| \tag{17}$$

In expression (17), the Σ operation is cumulatively executed for n and the range assumed for n is limited to the range over which the data $A_{n-1}$, An, $A_{n+1}$, $B_{n-1+k}$, $B_{n+k}$ and $B_{n+1+k}$ are present in correspondence to the shift quantity k.

Correlation Operation Processing Example 7

The correlation quantity C(k) is determined as expressed below.

$$C(k)=\Sigma|(A_n^2\times B_{n-2+k}\times B_{n+2+k})-(B_{n+k}^2\times A_{n-2}\times A_{n+2})| \tag{18}$$

The Σ operation is cumulatively executed for n and the range assumed for n is limited to the range over which the data $A_{n-2}$, $A_n$, $A_{n+2}$, $B_{n-2+k}$, $B_{n+k}$ and $B_{n+2+k}$ are present in correspondence to the shift quantity k. The correlation operation in correlation operation processing example 7 is executed by using a wider range of data compared to the range of data used in correlation operation processing example 6 expressed in (17). Through correlation operation processing example 7, accurate correlation operation results can be obtained even when the gain difference fluctuates depending upon the position assumed in the data strings.

Variations of the Embodiment

Figure 21:
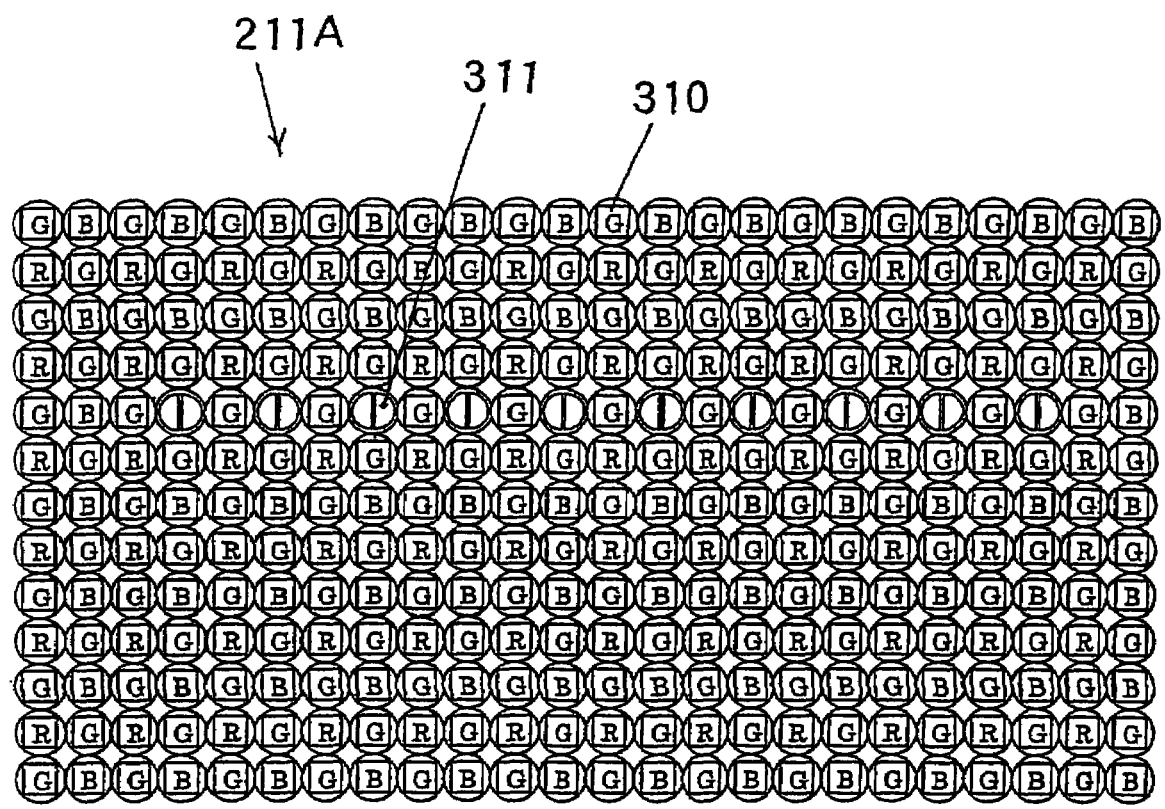
FIG. 21 presents an example of an image sensor achieved in a variation that includes focus detection pixels disposed in a single row and each occupying every second position that would otherwise be occupied by a blue imaging pixel.

While the image sensor 211 shown in FIG. 3 includes focus detection pixels 311 disposed with one directly beside the next without any intervals in between, FIG. 21 shows an image sensor 211A with focus detection pixels 311 disposed in a single row, each taking up every other pixel position, which would otherwise be taken up by a blue imaging pixel 310. While this positional arrangement, with the focus detection pixels 311 spaced with intervals from each other, somewhat reduces the focus detection accuracy, the lower density with which the focus detection pixels 311 are arrayed helps improve the quality of the image resulting from interpolation processing executed to obtain image signals at positions occupied by the focus detection pixels 311.

Figure 22A:
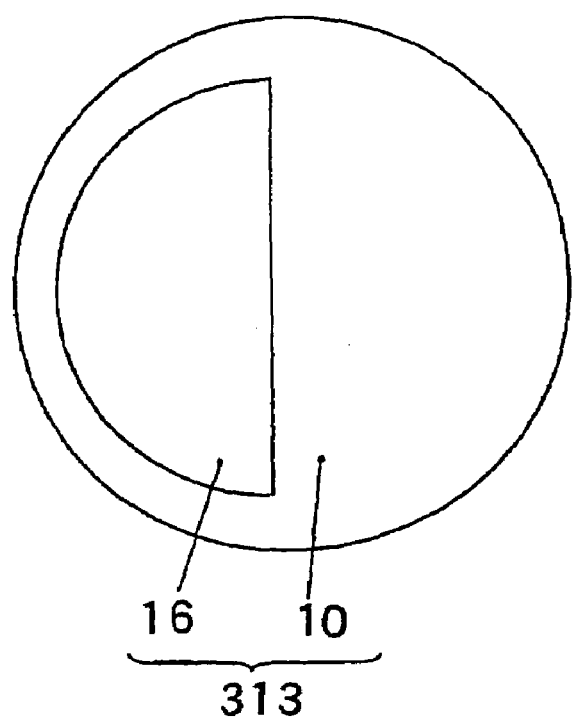
FIGS. 22A and 22B each show a focus detection pixel equipped with a single photoelectric conversion unit.
Figure 22B:
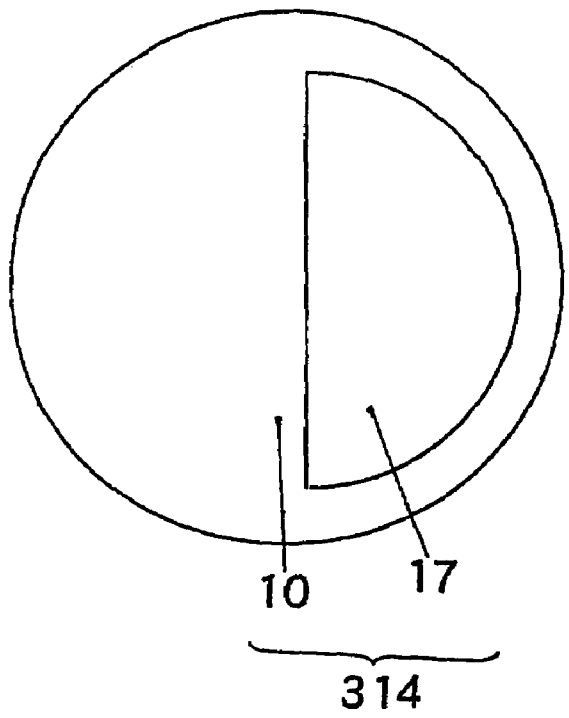

The focus detection pixels 311 at the image sensor 211 in FIG. 3 each include a pair of photoelectric conversion units 12 and 13, as shown in FIG. 5. FIGS. 22A and 22B show focus detection pixels 313 and 314 each equipped with a single photoelectric conversion unit. As shown in FIG. 22A, the focus detection pixel 313 includes a micro-lens 10 and a photoelectric conversion unit 16. The focus detection pixel 314 includes a micro-lens 10 and a photoelectric conversion unit 17, as shown in FIG. 22B. The photoelectric conversion units 16 and 17 projected onto the exit pupil of the exchangeable lens via the micro-lenses 10 form the range-finding peoples 92 and 93 in FIG. 10. Thus, a pair of image outputs to be used in focus detection can be obtained via the focus detection pixels 313 and 314.

Figure 23:
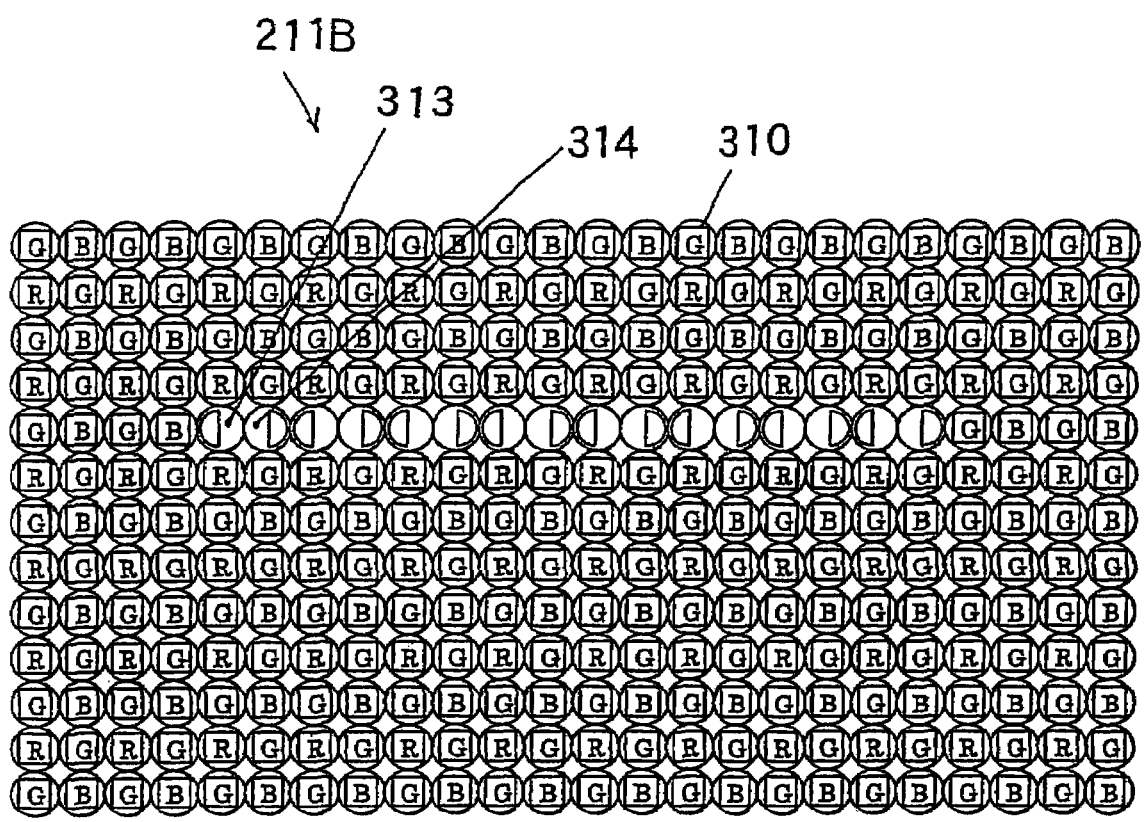
FIG. 23 presents an example of an image sensor achieved in another variation that includes the focus detection pixels shown in FIGS. 22A and 22B disposed in a single row and occupying alternate positions.

FIG. 23 shows an image sensor 211B with focus detection pixels 313 and 314 in FIGS. 22A and 22B alternately disposed in a single row. A focus detection pixel 313 and the adjacent focus detection pixel 314, paired up with each other, are equivalent to a focus detection pixel 311 in the image sensor 211 in FIG. 3, and a pair of image outputs to be used in the focus detection are obtained via the pair of focus detection pixels 313 and 314.

Figure 24A:
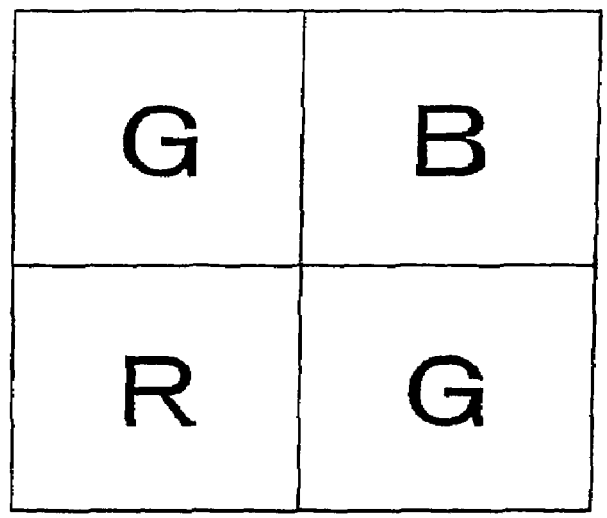
FIGS. 24A and 24B respectively show a Bayer array and a complementary-color array that may be assumed for the imaging pixels.
Figure 24B:
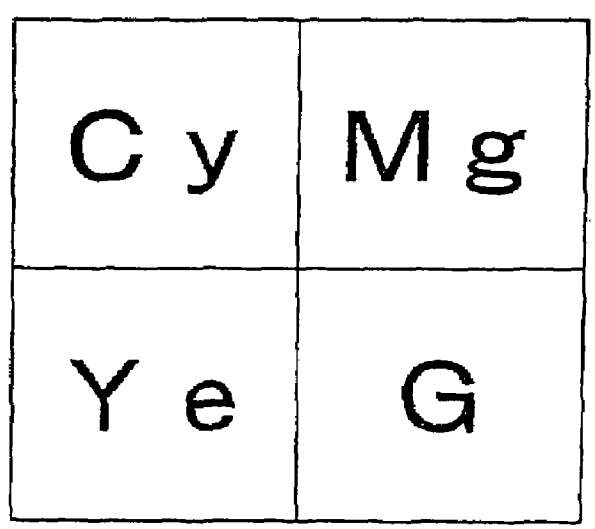

While the imaging pixels 310 each equipped with a red (R), green (G) or blue (B) color filter in the image sensor 211 in FIG. 3 assume a Bayer array as illustrated in FIG. 24A, color filters adopting structures and arrays other than those in the embodiment may be used instead. For instance, green (G) filters, yellow (Ye) filters, magenta (Mg) filters and cyan (Cy) filters disposed in a complementary-color array, as shown in FIG. 24B, may be used. In conjunction with such complementary color filters, the focus detection pixels 311 should be disposed at positions that would otherwise be taken up by pixels equipped with cyan filters and magenta filters, since cyan and magenta contain a blue component, which does not produce a significant output error.

While no color filters are present at the focus detection pixels 311 in the image sensor 211 in FIG. 3, the present invention may be adopted in conjunction with focus detection pixels each equipped with a color filter assuming one of the colors matching those of the color filters disposed at the imaging pixels 310, e.g., a green color filter.

While corrected image data that include interpolated data generated by obtaining the image signals at positions occupied by the focus detection pixels 311 through interpolation processing are stored in the memory card 213 in the imaging operation shown in FIG. 13, the corrected image data may also be displayed at the electronic viewfinder 215 or on the screen of a rear monitor (not shown) disposed at the rear surface of the body.

It is to be noted that the image sensors 211, 211A and 211B may each be constituted with a CCD image sensor or a CMOS image sensor.

While an explanation is given above in reference to the embodiment on an example in which focus detection is executed through a split-pupil method by using micro-lenses, the correlation operation method according to the present invention may also be adopted in focus detection achieved through a split image-reforming pupil method to achieve similar advantages, as well as in the focus detection achieved through the split-pupil method described above.

Figure 25:
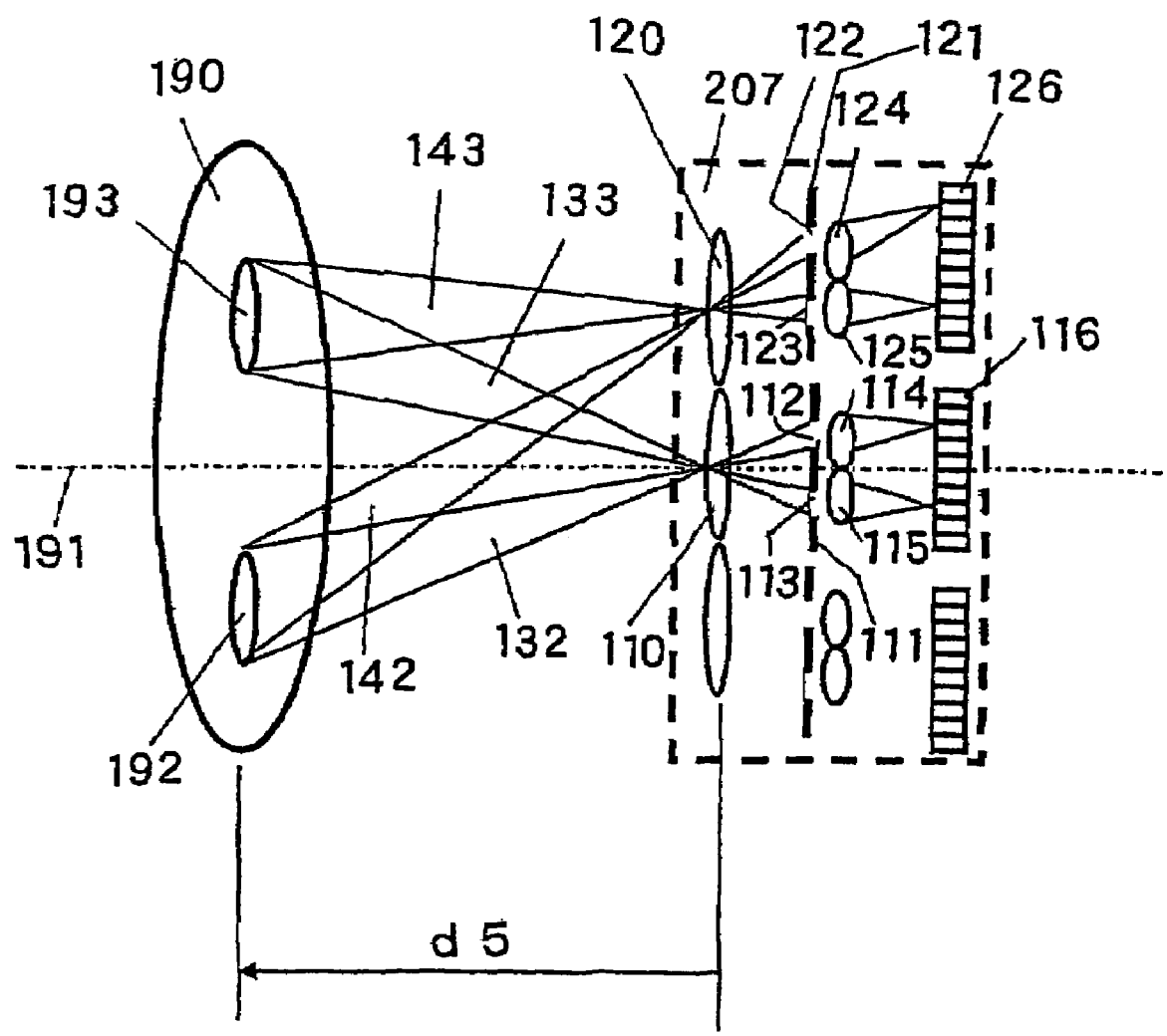
FIG. 25 illustrates how focus detection may be executed through a split image-reforming pupil method by adopting the correlation operation method achieved in the embodiment of the present invention.

An explanation is now given in reference to FIG. 25 on the focus detection achieved by executing the correlation operation in the embodiment of the present invention in conjunction with a split image-reforming pupil method. In the figure, reference numeral 191 indicates the optical axis of the exchangeable lens, reference numerals 110 and 120 each indicate a condenser lens, reference numerals 111 and 121 each indicate an aperture mask, reference numerals 112, 113, 122 and 123 each indicate an aperture opening, reference numerals 114, 115, 124 and 125 each indicate an image reforming lens and reference numerals 116 and 126 each indicate an image sensor (CCD) used for focus detection. In addition, reference numerals 132, 133, 142 and 143 each indicate a focus detection light flux and reference numeral 190 indicates an exit pupil set over a distance d5 further frontward relative to the predetermined imaging plane of the exchangeable lens. It is to be noted that the distance d5, which is determined in correspondence to the focal length of the condenser lenses 110 and 120, the distances to the aperture openings 112, 113, 122 and 123 relative to the condenser lenses 110 and 120 and the like, is referred to as the range-finding pupil distance. Reference numeral 192 indicates the area (range-finding pupil) over which the aperture openings 112 and 122 are projected via the condenser lenses 110 and 120, whereas reference numeral 193 indicates the area (range-finding pupil) over which the aperture openings 113 and 123 are projected via the condenser lenses 110 and 120.

The condenser lens 110, the aperture mask 111, the aperture openings 112 and 113, the image reforming lenses 114 and 115, and the image sensor 116 constitute a focus detection unit engaged in focus detection at a given position through split-pupil phase difference detection by adopting the image reforming method. FIG. 25 schematically illustrates the focus detection unit set on the optical axis 191 and a focus detection unit set off the optical axis. By using a plurality of focus detection units in combination, an exclusive focus detection sensor exclusively used for focus detection through split-pupil phase difference detection by adopting the image reforming method at the five focus detection positions G1~G5 in FIG. 2, is realized.

The focus detection unit, which includes the condenser lens 110, comprises the condenser lens 110 disposed near the predetermined imaging plane of the exchangeable lens, the image sensor 116 disposed to the rear of the condenser lens 110, the pair of image reforming lenses 114 and 115 disposed between the condenser lens 110 and the image sensor 116, which reform a primary image having been formed near the predetermined imaging plane, onto the image sensor 116 and the aperture mask 111 having formed therein the pair of aperture openings 112 and 113, which is disposed near (to the front in the figure) the pair of image reforming lenses. The image sensor 116 is a line sensor with a plurality of photoelectric conversion units densely disposed along a straight line and the direction along which the photoelectric conversion units are disposed is aligned with the direction along which the pair of range-finding pupils are separated from each other (i.e., the direction along which the aperture openings are set side-by-side).

Information corresponding to the image intensity distribution of the pair of images reformed on the image sensor 116 is output from the image sensor 116, and by executing image shift detection operation processing (correlation processing and phase difference detection processing) to be detailed later on this information, the image shift quantity indicating the extent of image shift manifesting between the pair of images is detected through the split-pupil phase difference detection method (image reforming method). Then, the image shift quantity is multiplied by a predetermined conversion coefficient so as to calculate the extent of deviation (defocus amount) of the current imaging plane relative to the predetermined imaging plane.

The image sensor 116 is projected onto the predetermined imaging plane via the image reforming lenses 114 and 115, and the detection accuracy with which the defocus amount (image shift quantity) is detected is determined in correspondence to the image shift quantity detection pitch (the pitch with which the photoelectric conversion units, projected onto the predetermined imaging plane, are arrayed in the image reforming method).

The aperture openings 112 and 113 at the aperture mask 111 are projected via the condenser lens 110 over the areas 192 and 193 on the exit pupil 190. These areas 192 and 193 are referred to as range-finding pupils. In other words, the pair of images are reformed on the image sensor 116 with the light fluxes passing through the pair of range-finding pupils 192 and 193 on the exit pupil 190. The light fluxes 132 and 133 passing through the pair of range-finding pupils 192 and 193 on the exit pupil 190 are referred to as focus detection light fluxes.

Figure 26:
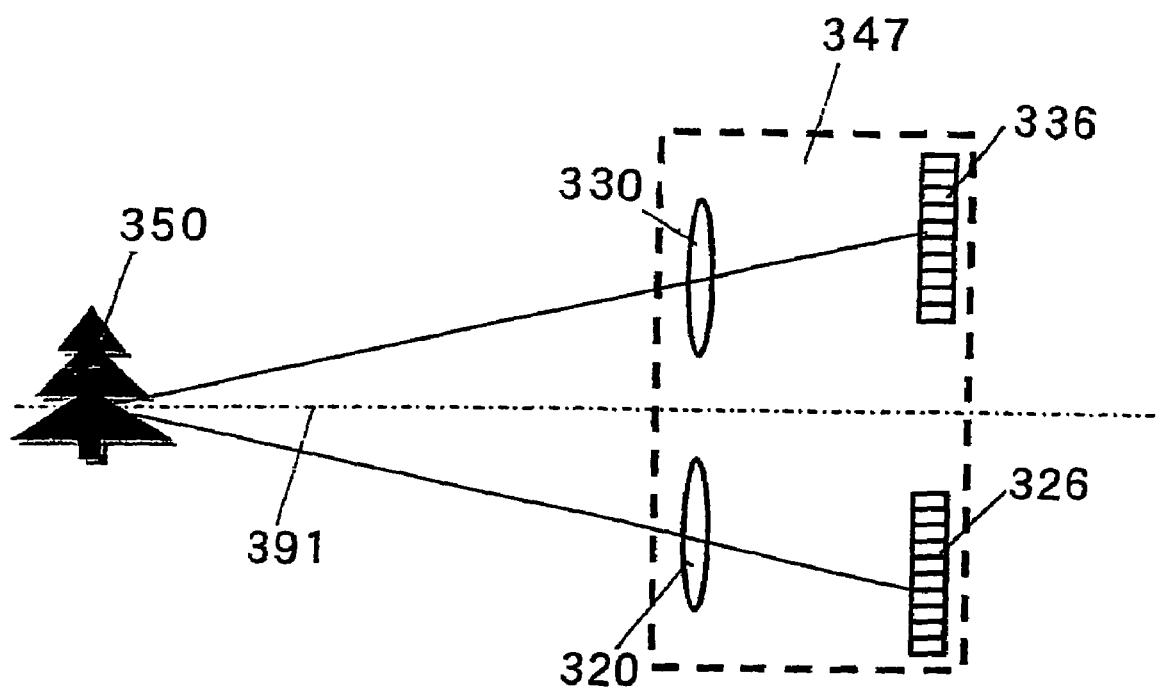
FIG. 26 shows how distance measurement may be executed through ambient light trigonometric measurement by adopting the correlation operation method achieved in the embodiment of the present invention.

In addition, the present invention may also be adopted equally effectively in distance measurement through an external light trigonometric range-finding method, as well as in the focus detection executed through the split-pupil method by using light fluxes passing through the photographic optical system. In reference to FIG. 26, distance measurement through an external light trigonometric range-finding method adopting the correlation operation executed in the embodiment of the present invention is explained. A unit comprising a lens 320 and an image sensor 326 disposed at the imaging plane of the lens 320 and a unit comprising a lens 330 and data an image sensor 336 disposed at the imaging plane of the lens 330 are set over the distance matching the baseline length. The pair of units constitutes a range-finding device 347. Images of a range-finding target 350 are formed on the image sensors 326 and 336 via the lenses 320 and 330 respectively.

The positional relationship between the images formed on the image sensors 326 and 336 changes in correspondence to the distance from the range-finding device 347 to the range-finding target 350. Accordingly, the positional relationship between the two images relative to each other can be detected by executing the image shift detection according to the present invention on signal data provided from the image sensors 326 and 336 and then, the distance to the range-finding target 350 can be determined based upon the positional relationship. A degree difference between the pair of signals may occur or distortion may occur in the pair of signals as dirt builds up or raindrops settle on the lenses 320 and 330 used in the external light trigonometric range-finding method. However, even if such a problem occurs, the correlation between the pair of image signal data strings output from the image sensors 326 and 330 can be detected accurately by adopting the correlation operation method according to the present invention.

It is to be noted that while the correlation degree is calculated based upon the sum of the absolute values representing the differences between the two sets of data in the explanation provided above, the correlation operation may be executed by adopting another method. In addition, while the average values are subtracted from the corresponding signal data strings in order to cancel the offset difference in the initial signal data strings, the average values may be calculated by using the values indicated by all the sets of the signal data as expressed in (2) or they may be calculated by using the values of the data present in the range (the range assumed form in the operation) used in the operation executed as part of the correlation operation expressed in (6) and (7). Furthermore, while the data obtained by subtracting the corresponding average values from the initial signal data strings, are divided by average values obtained by averaging the absolute values indicated by the data in the signal data strings from which the first average values have been subtracted, in order to cancel the gain difference, the average values of the absolute values may be calculated by using the values indicated by all the sets of the signal data as expressed in (4) or they may be calculated by using the values of the data present in the range (the range assumed for n in the $\Sigma$ operation) used in the $\Sigma$ operation executed as part of the correlation operation expressed in (6) and (7).

Alternatively, the data obtained by subtracting the average values from the signal data strings may be divided by the total sums of the absolute values instead of the average values of the absolute values. In other words, in the normalization processing executed in step 330, the total sum (or the average value) of the absolute values indicated by the data in the third signal data string and the total sum (or the average value) of the absolute values indicated by the data in the fourth signal data string may be calculated, a fifth signal data string may be generated by dividing the third signal data string by the total sum (or the average value) of the absolute values indicated by the data in the third signal data string and a sixth signal data string may be generated by dividing the fourth signal data string by the total sum (or the average value) of the absolute values indicated by the data in the fourth signal data string. In addition, while the average values are calculated in correspondence to the two signal data strings and the average values are then subtracted from the corresponding signal data strings in the average value subtraction processing executed in step 320, a DC component may be eliminated through low-frequency cut filter processing executed on the signal data strings by executing a linear differential filter operation (expression (19)), a quadratic differential filter operation (expression (20)) or the like, instead.

$$a'_n = a_n - a_{n+1}$$
$$b'_n = b_n - b_{n+1}, \text{ with } n=1 \sim N \quad (19)$$
$$a'_n = -a_n + 2 \times a_{n+1} - a_{n+2}$$
$$b'_n = -b_n + 2 \times b_{n+1} - b_{n+2}, \text{ with } n=1 \sim N \quad (20)$$

In any case, since the average value subtraction processing is executed in order to match the degrees of the DC component (equalize the degrees of the DC component) in the two signal data strings so as to not allow the difference in the DC component (offset) to adversely affect the data comparison integration-type correlation operation, it is not strictly necessary to completely eliminate the DC component. For instance, instead of subtracting the average values from the two signal data strings, specific values may be added to/subtracted from the two signal data strings so as to achieve average values equal to each other.

Moreover, while the amplitudes (AC components) of the signals attributable to the gain difference are normalized by dividing the signal data strings by the total sums (or the average values) of the absolute values indicated by the data in the respective signal data strings in the normalization processing executed in step 330, a parameter (e.g., the difference between the maximum value and the minimum value) related to the amplitude manifesting in the signal data strings may be calculated and the signal data strings may each be normalized (divided) in correspondence to this parameter instead. As an alternative, the signal data strings may each be normalized (divided) by dividing the initial signal data string by a parameter representing the cumulative sum of the absolute values indicated by the data having undergone low-frequency cut filter (or high frequency pass filter) processing such as that expressed in (19) and (20) or the data amplitude (the difference between the maximum value and the minimum value). In any case, since the normalization subtraction processing described above is executed in order to match the levels of the AC component (equalize the levels of the AC component) in the two signal data strings so as to not allow the difference in the AC component to adversely affect the operation results of the data comparison integration-type correlation operation, it is not strictly necessary to individually normalize the two signal data strings and an adjustment operation may be simply executed on one of the signal data strings so as to match the level of the AC component in the signal data string to the level of the AC component in the other signal data string. For instance, the AC component levels may be matched by determining the cumulative sums of the absolute values indicated by the data in the two signal data strings having undergone low-frequency cut filter processing and then multiplying one of the signal data strings by an adjustment parameter (=cumulative value corresponding to signals in one signal data string/cumulative value corresponding to signals in the other signal data string).

It is to be noted that if no offset difference (DC component difference) manifests in the first signal data string and the second signal data string or only a very slight offset difference manifests in the first signal data string and the second signal data string, the DC component equalization processing may be skipped. In addition, if no gain difference (AC component difference) manifests in the first signal data string and the second signal data string or only a very slight offset difference manifests in the first signal data string and the second signal data string, the AC component equalization processing may be skipped. Furthermore, while the AC component equalization processing is executed after the DC component equalization processing in the explanation provided above, the DC component equalization processing may be executed after the AC component equalization processing instead.

The imaging device achieved in the embodiment of the present invention may be adopted in a digital still camera or a film still camera with an integrated lens, or a video camera, as well as a digital still camera or a film still camera constituted with an exchangeable lens and a camera body. In addition, the present invention may also be adopted in a compact camera module built into a portable telephone or the like or in a surveillance camera. Furthermore, it may be adopted in a focus detection device or a range-finding device used in a system other than a camera, or it may be adopted in a stereo range-finding device as well.

The embodiment described above may also be adopted in a device that detects movement of a subject image or vibration of a camera by detecting a correlation manifesting between signals output by an image sensor at different time points. In addition, it may be adopted in pattern matching, whereby the pattern of an image signal provided from an image sensor is matched against a specific image signal. Moreover, the advantages described above can be achieved by adopting the embodiment in detection of all types of correlation between to signals, e.g., correlation manifesting between two sets of audio data, instead of in detection of the correlation between two sets of image signal data.

As described above, the correlation that manifests between two signal data strings can be detected accurately by adopting the embodiment, even if, for instance, an eclipse attributable to the photographic optical system occurs in one of the pair of focus detection light fluxes and a relative distortion occurs in the pair of signal data strings output from the image sensor.

In addition, even when an offset difference or a gain difference manifests in signals output in correspondence to a pair of focus detection light fluxes, the correlation between the two signal data strings can be accurately detected.

The above described embodiments are examples and various modifications can be made without departing from the spirit and scope of the invention.

What is claimed is:

1. A correlation operation method, comprising:
executing a first processing to match a signal level of an AC component contained in a first signal data string with a signal level of an AC component contained in a second signal data string by canceling a gain difference between the first signal data string and the second signal data string to create a first processed first signal data string and a first processed second signal data string; and
calculating a correlation degree to obtain a degree of correlation between the first processed first signal data string and the first processed second signal data string,
the first signal data string is made up with a plurality of sets of first signal data and the second signal data string is made up with a plurality of sets of second signal data.

2. A correlation operation method according to claim 1, further comprising:
executing a second processing to match a signal level of a DC component contained in the first signal data string with a signal level of a DC component contained in the second signal data string by canceling an offset difference between the first signal data string and the second signal data string to create a second processed first signal data string and a second processed second signal data string, wherein:
the first processing is executed on at least either the second processed first signal data string or the second processed second signal data string.

3. A correlation operation method, comprising:
executing a first processing to match a signal level of an AC component contained in a first signal data string with a signal level of an AC component contained in a second signal data string by canceling a gain difference between the first signal data string and the second signal data string to create a first processed first signal data string and a first processed second signal data string,
the first signal data string is made up with a plurality of sets of first signal data and the second signal data string is made up with a plurality of sets of second signal data; and
calculating a correlation degree to obtain a degree of correlation between the first processed first signal data string and the first processed second signal data string, wherein in the calculation of the correlation degree:
the first processed first signal data string and the first processed second signal data string are shifted relative to each other by a specific amount, and then data in the first processed first signal data string and data in the first processed second signal data string present at positions corresponding to each other are compared with each other through comparison operation;
a cumulative quantity is determined by integrating absolute values resulting from the comparison operation executed for different sets of data in the first processed first signal data string and the second processed second signal data string present at corresponding positions, and also by varying the specific amount to which the first processed first signal data string and the first processed second signal data string are shifted relative to each other; and
the correlation degree is determined by ascertaining a relative shift quantity indicating an amount of shift manifesting between the first processed first signal data string and the first processed second signal data string relative to each other based upon the specific amount at which the cumulative quantity assumes an extreme value.

4. A correlation operation method, comprising:
executing a first processing to match a signal level of an AC component contained in a first signal data string with a signal level of an AC component contained in a second signal data string by canceling a gain difference between the first signal data string and the second signal data string to create a third signal data string and a fourth signal data string,
the first signal data string is made up with a plurality of sets of first signal data and the second signal data string is made up with a plurality of sets of second signal data; and
calculating a correlation degree to obtain a degree of correlation between the third signal data string and the fourth signal data string, wherein:

in executing the first processing, the third signal data string is generated by normalizing the first signal data string and the fourth signal data string is generated by normalizing the second signal data string, the first signal data string being normalized by taking an absolute value of the plurality of sets of first signal data to create an absolute set of first signal data, calculating the sum of the absolute set of first signal data to create a sum of first signal data, and then dividing the first signal data string by the sum of the first signal data, and the second signal data string being normalized by taking an absolute value of the plurality of sets of second signal data to create an absolute set of second signal data, calculating the sum of the absolute set of second signal data to create a sum of second signal data, and then dividing the second signal data string by the sum of second signal data.

5. A correlation operation method, comprising:

executing a first processing to match a signal level of an AC component contained in a first signal data string with a signal level of an AC component contained in a second signal data string by canceling a gain difference between the first signal data string and the second signal data string to create a third signal data string and a fourth signal data string, the first signal data string is made up with a plurality of sets of first signal data and the second signal data string is made up with a plurality of sets of second signal data; and calculating a correlation degree to obtain a degree of correlation between the third signal data string and the fourth signal data string, wherein:

in executing the first processing, the third signal data string is generated by normalizing the first signal data string and the fourth signal data string is generated by normalizing the second signal data string, the first signal data string being normalized by taking an absolute value of the plurality of sets of first signal data to create an absolute set of first signal data, calculating the sum of the absolute set of first signal data to create a sum of first signal data, and then dividing the first signal data string by the sum of the first signal data, and the second signal data string being normalized by taking an absolute value of the plurality of sets of second signal data to create an absolute set of second signal data, calculating the sum of the absolute set of second signal data to create a sum of second signal data, and then dividing the second signal data string by the sum of second signal data; and in the calculation of the correlation degree, the third signal data string and the fourth signal data string are shifted relative to each other by a specific amount, then data in the third signal data string and data in the fourth signal data string present at positions corresponding to each other are compared with each other through comparison operation, a cumulative quantity is determined by integrating absolute values resulting from the comparison operation executed for different sets of data in the third signal data string and the fourth signal data string present at corresponding positions, and also by varying the specific amount to which the third signal data string and the fourth signal data string are shifted relative to each other, and the correlation degree of the correlation between the first signal data string and the second signal data string is determined by ascertaining a relative shift quantity indicating an amount of shift manifesting between the third signal data string and the fourth signal data string relative to each other based upon the specific amount at which the cumulative quantity assumes an extreme value.

6. A correlation operation method, comprising:

executing a first processing to match a signal level of an AC component contained in a first signal data string with a signal level of an AC component contained in a second signal data string by canceling a gain difference between the first signal data string and the second signal data string to create a third signal data string and a fourth signal data string, the first signal data string is made up with a plurality of sets of first signal data and the second signal data string is made up with a plurality of sets of second signal data; and calculating a correlation degree to obtain a degree of correlation between the third signal data string and the fourth signal data string, wherein:

in executing the first processing, the third signal data string is generated by normalizing the first signal data string and the fourth signal data string is generated by normalizing the second signal data string, the first signal data string being normalized by taking an absolute value of the plurality of sets of first signal data to create an absolute set of first signal data, calculating the sum of the absolute set of first signal data to create a sum of first signal data, and then dividing the first signal data string by the sum of the first signal data, and the second signal data string being normalized by taking an absolute value of the plurality of sets of second signal data to create an absolute set of second signal data, calculating the sum of the absolute set of second signal data to create a sum of second signal data, and then dividing the second signal data string by the sum of second signal data; and in calculating the correlation degree, a correlation degree indicating a degree of correlation between the third signal data string and the fourth signal data string is calculated based upon a total sum of absolute values representing differences between first data in the third signal data string and second data in the fourth signal data string corresponding to the first data.

7. A correlation operation method, comprising:

executing a first processing to match a signal level of an AC component contained in a first signal data string with a signal level of an AC component contained in a second signal data string by canceling a gain difference between the first signal data string and the second signal data string to create a third signal data string and a fourth signal data string, the first signal data string is made up with a plurality of sets of first signal data and the second signal data string is made up with a plurality of sets of second signal data; and calculating a correlation degree to obtain a degree of correlation between the third signal data string and the fourth signal data string, wherein:

in executing the first processing, the third signal data string is generated by normalizing the first signal data string and the fourth signal data string is generated by normalizing the second signal data string, the first signal data string being normalized by taking an absolute value of the plurality of sets of first signal data to create an absolute set of first signal data, calculating the sum of the absolute set of first signal data to create a sum of first signal data, and then dividing the first signal data string by the sum of the first signal data, and the second signal data string being normalized by taking an absolute value of the plurality of sets of second signal data to create an absolute set of second signal data, calculating the sum of the absolute set of second signal data to create a sum of second signal data, and then dividing the second signal data string by the sum of second signal data; and in the calculation of the correlation degree, the third signal data string and the fourth signal data string are shifted relative to each other by a specific amount, then a difference between data in the third signal data string and data in the fourth signal data string present at positions corresponding to each other is calculated, a cumulative quantity is determined by integrating absolute values representing differences determined for different sets of data in the third signal data string and the fourth signal data string present at corresponding positions to each other and also by altering the specific amount to which the third signal data string and the fourth signal data string are shifted relative to each other, and the correlation degree is determined by ascertaining a relative shift quantity indicating an amount of shift manifesting between the third signal data string and the fourth signal data string relative to each other based upon the specific amount at which the cumulative quantity assumes an extreme value.

8. A correlation operation method according to claim 4, wherein the correlation degree calculation processing includes:

first information generation processing executed to generate first operation data by multiplying first data in the third signal data string by data present near second data in the fourth signal data string corresponding to the first data;

second information generation processing executed to generate second operation data by multiplying the second data in the fourth signal data string by data present near the first data in the third signal data string; and processing executed to calculate a correlation degree indicating a degree of correlation between the first operation data and the second operation data.

9. A correlation operation method according to claim 4, wherein:

the correlation degree calculation processing is executed at each shift position assumed as the third signal data string and the fourth signal data string are shifted relative to each other along a direction in which the data in the data strings are strung.

10. A correlation operation device, comprising:

a correlation operation unit that calculates a correlation degree indicating a degree of correlation between a first signal data string and a second signal data string, both the first signal data string and the second signal data string having undergone first processing executed to match a signal level of an AC component contained in the first signal data string with a signal level of an AC component contained in the second signal data string, by canceling a gain difference between the first signal data string and the second signal data string to create a first processed first signal data string and a first processed second signal data string, the first signal data string is made up with a plurality of sets of first signal data and the second signal data string is made up with a plurality of sets of second signal data.

11. An arithmetic operation device according to claim 10, wherein:

the correlation operation unit also executes second processing for matching a signal level of a DC component contained in the first signal data string with a signal level of a DC component contained in the second signal data string by canceling an offset difference between the first signal data string and the second signal data string to create a second processed first signal data string and a second processed second signal data string, and executes the first processing on at least either of the second processed first signal data string or the second processed second signal data string, the first signal data string is made up with a plurality of sets of first signal data and the second signal data string is made up with a plurality of sets of second signal data.

12. A correlation operation device, comprising:

a normalization unit that generates a third signal data string by normalizing a first signal data string, and generates a fourth signal data string by normalizing a second signal data string, the first signal data string is made up with a plurality of sets of first signal data and the second signal data string is made up with a plurality of sets of second signal data, and the first signal data string being normalized by taking an absolute value of the plurality of sets of first signal data to create an absolute set of first signal data, calculating the sum of the absolute set of first signal data to create a sum of first signal data, and then dividing the first signal data string by the sum of first signal data, the second signal data string being normalized by taking an absolute value of the plurality of sets of second signal data to create an absolute set of second signal data, calculating the sum of the absolute set of second signal data to create a sum of second signal data, and then dividing the second signal data string by the sum of second signal data; and a correlation degree calculation unit that calculates a correlation degree indicating a degree of correlation between the third signal data string and the fourth signal data string.

13. A correlation operation device according to claim 12, further comprising:

an average value subtraction unit that generates a fifth signal data string constituted with sets of fifth signal data each obtained by subtracting an average value of values indicated by the plurality of sets of first signal data from a set of data in the first signal data string, and a sixth signal data string constituted with sets of sixth signal data each obtained by subtracting an average value of values indicated by the plurality of sets of second signal data from a set of data in the second signal data string, wherein:

the normalization unit generates the third signal data string by normalizing the fifth signal data string and generates the fourth signal data string by normalizing the sixth signal data string, the fifth signal data string being normalized by taking an absolute value of the plurality of sets of fifth signal data to create an absolute set of fifth signal data, calculating the sum of the absolute set of fifth signal data to create a sum of fifth signal data, and then dividing the fifth signal data string by the sum of the fifth signal data, and the sixth signal data string being normalized by taking an absolute value of the plurality of sets of sixth signal data to create an absolute set of sixth signal data, calculating the sum of the absolute set of sixth signal data to create a sum of sixth signal data, and then dividing the sixth signal data string by the sum of sixth signal data.

14. A correlation operation device according to claim 12, wherein:

the correlation degree calculation unit calculates the correlation degree between the third signal data string and the fourth signal data string in correspondence to a total sum of absolute values each representing a difference between first data in the third signal data string and second data in the fourth signal data string corresponding to the first data.

15. A correlation operation device according to claim 12, wherein:

the correlation degree calculation unit includes a first information generation unit that generates first operation data by multiplying first data in the third signal data string by data present near second data in the fourth signal data string corresponding to the first data, and a second information generation unit that generates second operation data by multiplying the second data in the fourth signal data string by data present near the first data in the third signal data string; and the correlation degree calculation unit calculates a correlation degree indicating a degree of correlation between the first operation data and the second operation data.

16. A focus detection device, comprising:

a photoelectric conversion element that receives via a focus detection optical system light fluxes having passed through a pair of pupil areas at a photographic optical system and outputs a pair of subject image signals;

an image shift detection unit that determines a correlation degree indicating a degree of correlation between the pair of subject image signals output from the photoelectric conversion element by adopting a correlation operation method according to claim 1 and detects an image shift quantity indicating an amount of image shift manifested by images formed through the photographic optical system based upon the correlation degree; and a focus detection unit that detects a state of focus adjustment at the photographic optical system based upon the image shift quantity.

17. A focus detection device, comprising:

a photoelectric conversion unit that includes a micro-lens and a photoelectric conversion element, receives at the photoelectric conversion element via the micro-lens light fluxes having passed through a pair of pupil areas at a photographic optical system and outputs a pair of subject image signals;

an image shift detection unit that determines a correlation degree indicating a degree of correlation between the pair of subject image signals output from the photoelectric conversion unit by adopting a correlation operation method according to claim 1 and detects an image shift quantity indicating an amount of image shift manifested by images formed through the photographic optical system based upon the correlation degree; and a focus detection unit that detects a state of focus adjustment at the photographic optical system based upon the image shift quantity.

18. A focus detection device according to claim 16, wherein:

the focus detection optical system is an image reforming optical system that reforms onto the photoelectric conversion element a subject image having been formed on a predetermined focal plane of the photographic optical system.

19. An imaging device, comprising:

a focus detection device according to claim 16; and an image sensor that captures an image formed through the photographic optical system having undergone focus adjustment executed based upon the state of focus adjustment detected by the focus detection device.

* * * * *